(12) United States Patent
Jorgensen et al.

(10) Patent No.: US 9,638,842 B2
(45) Date of Patent: May 2, 2017

(54) MODIFICATION OF UV ABSORPTION PROFILE OF POLYMER FILM REFLECTORS TO INCREASE SOLAR-WEIGHTED REFLECTANCE

(71) Applicant: SkyFuel, Inc., Lakewood, CO (US)

(72) Inventors: Gary Jorgensen, Pine, CO (US); Randall C. Gee, Arvada, CO (US); David White, Denver, CO (US)

(73) Assignee: SKYFUEL, INC., Lakewood, CO (US)

( * ) Notice: Subject to any disclaimer, the term of this patent is extended or adjusted under 35 U.S.C. 154(b) by 934 days.

(21) Appl. No.: 13/790,099

(22) Filed: Mar. 8, 2013

(65) Prior Publication Data
US 2014/0251313 A1 Sep. 11, 2014

(51) Int. Cl.
*F24J 2/10* (2006.01)
*G02B 5/08* (2006.01)
*H02S 40/22* (2014.01)

(52) U.S. Cl.
CPC .......... *G02B 5/0808* (2013.01); *F24J 2/1057* (2013.01); *H02S 40/22* (2014.12); *Y02E 10/46* (2013.01); *Y10T 428/12549* (2015.01); *Y10T 428/264* (2015.01); *Y10T 428/265* (2015.01); *Y10T 428/269* (2015.01); *Y10T 428/2804* (2015.01); *Y10T 428/31678* (2015.04)

(58) Field of Classification Search
USPC ....................................................... 126/684
See application file for complete search history.

(56) References Cited

U.S. PATENT DOCUMENTS

| 2,955,955 A | 10/1960 | Orr |
| 3,775,226 A | 11/1973 | Windorf |
| 3,949,134 A * | 4/1976 | Willdorf ........... B32B 17/10018 156/99 |
| 4,170,683 A * | 10/1979 | Miklos ................... G11B 23/34 428/336 |
| 4,226,910 A | 10/1980 | Dahlen et al. |
| 4,230,763 A | 10/1980 | Skolnick |

(Continued)

FOREIGN PATENT DOCUMENTS

| CA | 721243 | 11/1965 |
| EP | 2738580 | 6/2014 |

(Continued)

OTHER PUBLICATIONS

Floch et al. (1994), "A Scratch-Resistant Single-Layer Antireflective Coating by a Low Temperature Sol-Gel Route", Journal of Sol-Gel Science and Technology 1(3): 293-304.

(Continued)

*Primary Examiner* — Avinash Savani
(74) *Attorney, Agent, or Firm* — Lathrop & Gage LLP

(57) ABSTRACT

Provided are reflective thin film constructions including a reduced number of layers, which provides for increased solar-weighted hemispherical reflectance and durability. Reflective films include those comprising an ultraviolet absorbing abrasion resistant coating over a metal layer. Also provided are ultraviolet absorbing abrasion resistant coatings and methods for optimizing the ultraviolet absorption of an abrasion resistant coating. Reflective films disclosed herein are useful for solar reflecting, solar collecting, and solar concentrating applications, such as for the generation of electrical power.

45 Claims, 14 Drawing Sheets

(56) References Cited

U.S. PATENT DOCUMENTS

| | | | |
|---|---|---|---|
| 4,307,150 A | 12/1981 | Roche | |
| 4,414,254 A | 11/1983 | Iwata et al. | |
| 4,446,262 A | 5/1984 | Okumura et al. | |
| 4,493,872 A | 1/1985 | Funderburk et al. | |
| 4,645,714 A | 2/1987 | Roche et al. | |
| 4,666,263 A | 5/1987 | Petcavich | |
| 4,710,426 A | 12/1987 | Stephens | |
| 4,853,283 A | 8/1989 | Skolnick | |
| 4,933,823 A | 6/1990 | Taylor | |
| 5,063,112 A | 11/1991 | Gross et al. | |
| 5,069,964 A | 12/1991 | Tolliver et al. | |
| 5,118,540 A | 6/1992 | Hutchison | |
| 5,251,064 A | 10/1993 | Tennant et al. | |
| 5,276,600 A | 1/1994 | Takase et al. | |
| 5,361,172 A | 11/1994 | Schissel et al. | |
| 5,681,642 A | 10/1997 | Sugisaki et al. | |
| 5,846,659 A | 12/1998 | Löwer et al. | |
| 6,420,032 B1 | 7/2002 | Iacovangelo | |
| 6,707,610 B1* | 3/2004 | Woodard | B32B 17/10018 359/582 |
| 6,989,924 B1 | 1/2006 | Jorgensen et al. | |
| 7,612,937 B2 | 11/2009 | Jorgensen et al. | |
| 2002/0102416 A1 | 8/2002 | Mayzel | |
| 2004/0032658 A1 | 2/2004 | Fleming | |
| 2006/0181765 A1 | 8/2006 | Jorgensen et al. | |
| 2010/0316852 A1* | 12/2010 | Condo | B32B 17/10 428/201 |
| 2012/0011850 A1 | 1/2012 | Hebrink et al. | |
| 2012/0182607 A1 | 7/2012 | Numrich et al. | |
| 2012/0211068 A1* | 8/2012 | Cornfeld | H01L 31/06875 136/255 |
| 2012/0227809 A1 | 9/2012 | Bharti et al. | |
| 2012/0229893 A1 | 9/2012 | Hebrink et al. | |
| 2012/0249900 A1* | 10/2012 | Koike | G02F 1/133528 349/15 |
| 2013/0081688 A1* | 4/2013 | Liang | H01L 31/02242 136/256 |
| 2014/0133028 A1 | 5/2014 | Kumagai | |

FOREIGN PATENT DOCUMENTS

| | | |
|---|---|---|
| JP | 59012952 A | 1/1984 |
| JP | 62011744 A | 1/1987 |
| JP | 2002063807 | 2/2002 |
| JP | 2003229009 | 8/2003 |
| WO | WO 00/07818 | 2/2000 |
| WO | WO 2013/015112 | 1/2013 |
| WO | WO 2013/036220 | 3/2013 |

OTHER PUBLICATIONS

International Search Report and Written Opinion dated Oct. 31, 2014, for corresponding International Application No. PCT/US2014/021304.
3M Renewable Energy Division. (Jan. 2012) "3M Solar Mirror Film 1100," St. Paul, MN.
ASTM G173. "Standard Tables for Reference Solar Spectral Irradiances: Direct Normal and Hemispherical on 37° Tilted Surface." *American Society for Testing and Materials Annual Book of Standards*. vol. 14.04, ASTM International, West Conshohocken PA, www.astm.org.
ASTM Standard D2486. "Standard Test Methods for Scrub Resistance of Wall Paints," *American Society for Testing and Materials Annual Book of Standards*. vol. 06.02, ASTM International, West Conshohocken PA, www.astm.org.
ASTM Standard D3359. "Standard Test Methods for Measuring Adhesion by Tape Test," *American Society for Testing and Materials Annual Book of Standards*. vol. 06.01, ASTM International, West Conshohocken PA, www.astm.org.
ASTM Standard D4060. "Standard Test Method for Abrasion Resistance of Organic Coatings by the Taber Abraser." *American Society for Testing and Materials Annual Book of Standards*. vol. 06.01, ASTM International, West Conshohocken PA, www.astm. org.
ASTM Standard D4587. "Standard Practice for Fluorescent UV-Condensation Exposure of Paint Related Coatings." *American Society for Testing and Materials Annual Book of Standards*. vol. 06.01, ASTM International, West Conshohocken PA, www.astm.org.
ASTM Standard D522. "Standard Test for Mandrel Bend Test of Attached Organic Coatings." *American Society for Testing and Materials Annual Book of Standards*. vol. 06.01, ASTM International, West Conshohocken PA, www.astm.org.
ASTM Standard D6944. "Standard Test Method for Resistance of Cured Coatings to Thermal Cycling." *American Society for Testing and Materials Annual Book of Standards*. vol. 06.02, ASTM International, West Conshohocken PA, www.astm.org.
ASTM Standard E 1038. "Standard Test Method for Determining Resistance of Photovoltaic Modules to Hail by Impact with Propelled Ice Balls." *American Society for Testing and Materials Annual Book of Standards*. vol. 01.05, ASTM International, West Conshohocken PA, www.astm.org.
ASTM Standard E 822-92. "Standard Practice for Determining Resistance of Solar Collector Covers to Hail by Impact with Propelled Ice Balls." *American Society for Testing and Materials Annual Book of Standards*. vol. 12.02, ASTM International, West Conshohocken PA, www.astm.org.
ASTM Standard G155. "Standard Practice for Operating Xenon Arc Light Apparatus for Exposure of Non-Metallic Materials." *American Society for Testing and Materials Annual Book of Standards*. vol. 14.04, ASTM International, West Conshohocken PA, www.astm.org.
Blanksby et al. (2003) "Bond Dissociation Energies of Organic Molecules," *Acc. Chem. Res*. 36:255-263.
Buildaroo (Nov. 8, 2009) "3M Thin Mirror Films for Solar Utility Applications—buildaroo.com," Online video clip. *Youtube*. Date Accessed on web: Jan. 30, 2014. http://www.youtube.com/watch?v=J0oA0jXITis.
Chen, D. (Oct. 29, 2010) "Technology Innovations in Parabolic Trough CSP," In; Delhi Renewable Energy Conference, Delhi, India.
DiGrazia et al. (Aug. 7-10, 2011) "Reflectech Polymer Mirror Film Advancements in Technology and Durability Testing," In; Engineering and Technology Conference, Washington, DC.
DiGrazia et al. (Jul. 19-23, 2009) "Reflectech Mirror Film Attributes and Durability for CSP Applications," In; Proceedings of Energy Sustainability 2009, San Francisco, CA.
Hardcastle et al. (2009) "Ultra-Accelerated Weathering System I: Design and Functional Considerations," In; Natural and Artificial Ageing of Polymers—4th European Weathering Symposium; Ed.: Reichert, Publication No. 11, Germany.
Hardcastle et al. (2010) "Ultra-Accelerated Weather System I: Design and Functional Considerations," Aug. 2010 28 Coatingtech.
International Search Report with Written Opinion corresponding to International Patent Application No. PCT/US2011/50542, mailed Jan. 24, 2012.
Jorgensen et al. (Sep. 21-24, 2010) "Development and testing of Abrasion Resistant Hard Coats for Polymer Film Reflectors," In; SolarPACES 2010, Perpignan, France.
Jorgensen et al. (Sep. 26-30, 1994) "Advanced Solar Reflector Materials for Solar Concentrators," In; 7th International Symposium on Solar Thermal Concentrating Technologies, Moscow, Russia.
Kanouni, M. (Apr. 8, 2004) "Degradation and Stabilization of Organic Coatings," In; Ciba Specialty Chemicals presentation at NREL.
Kennedy et al. (2005) "Optical Durability of Candidate Solar Reflectors," *Journal of Solar Engineering*. 127:262-269.
Meyen et al. (Sep. 21-24, 2010) "Standardization of Solar Mirror Reflectance Measurements—Round Robin Test," In; SolarPACES 2010, Perpignan, France.
Moulds (1999) "Hardcoats in the World of the Vacuum Coater," In; 42nd Annual Technical Conference Proceedings, Society of Vacuum Coaters, pp. 442-444.
Wypych, G. (1995) Handbook of Material Weathering. 2nd ed. *Chem Tech Publishing*. pp. 357-363.

(56) References Cited

OTHER PUBLICATIONS

Asp Plastics: "Spartech PEP Korad & Specialty Products, Property Unit Typical Values Test Method", Oct. 16, 2003, Retrieved from the Internet: URL:http://www.asp-plastics.com/uploaded/Korad_05001_50.pdf?phpMyAdmin=ZL Yk3EOYy66rGsV3iocmosz9tv1 [retrieved on Nov. 1, 2016].
Extended European Search Report dated Nov. 11, 2016, corresponding to European Patent Application No. 14760580.2.

* cited by examiner

| Structure | Kcal/mol | Wavelength (nm) |
|---|---|---|
| H₃C—H | 102 | 280 |
| H₃C–C(R1)(R2)–H | 98 | 292 |
| H₃C—O—R1 | 88 | 325 |
| H₃C–C(=O)–H | 88 | 325 |
| H₃C—CH₃ | 84 | 340 |
| H₃C–C(=O)–CH₃ | 79 | 362 |
| H₃C—O—OH | 36 | 794 |

Figure 10

MODIFICATION OF UV ABSORPTION PROFILE OF POLYMER FILM REFLECTORS TO INCREASE SOLAR-WEIGHTED REFLECTANCE

STATEMENT REGARDING FEDERALLY SPONSORED RESEARCH OR DEVELOPMENT

This invention was made with governmental support under awards DE-EE0003584.000 and DE-SC0009224TDD awarded by the Department of Energy. The government has certain rights in the invention.

CROSS REFERENCE TO RELATED APPLICATION

Not Applicable.

BACKGROUND

This invention is in the field of reflective films. This invention relates generally to an improved solar reflector for reflecting a majority of incident solar radiation, for example, for applications of concentrating solar power.

The overall reflectivity of solar reflectors is primarily dependent upon the reflection efficiency of the active reflective materials in the solar reflector as a function of the wavelength of incident solar electromagnetic radiation. Early thin-film reflectors incorporated thin aluminum films as the active reflector. For example, U.S. Pat. No. 4,307,150 for Weatherable Solar Reflector, issued on Dec. 21, 1981, discloses a solar reflector comprising an aluminum surface deposited over a flexible polyester support sheet. Later, silver thin-film reflectors were utilized, since silver is higher in reflectance than aluminum for most wavelengths of the solar spectrum. U.S. Pat. No. 4,645,714 for Corrosion-resistant Silver Mirror, issued on Feb. 24, 1987, discloses a specular reflective mirror film comprising a silver surface deposited over a polyester support film.

More recently, advanced optical materials and structures were incorporated into solar reflectors. For example, U.S. Patent Application Publication US 2012/0011850 for Broadband Reflectors, Concentrated Solar Power Systems, and Methods of Using the Same, published on Jan. 19, 2012, discloses a broadband UV-reflective multilayer optical film including alternating layers of higher and lower refractive index materials in a quarter-wave stack configuration, optimized for reflecting incident UV radiation.

SUMMARY

The simplicity, efficiency and weatherability of prior solar reflective films are improved upon by the present invention. For example, disclosed are reflective thin film constructions including a reduced number of layers, which provides for increased solar-weighted hemispherical reflectance and durability. Reflective films of the present invention include those comprising an ultraviolet absorbing abrasion resistant coating provided over a metal layer, and optionally over a polymeric layer. Also disclosed are ultraviolet absorbing abrasion resistant coatings and methods for optimizing the ultraviolet absorption of an abrasion resistant coating. Reflective films disclosed herein are useful for solar reflecting, solar collecting, and solar concentrating applications, such as for the generation of electrical power. In an embodiment, the reflective films of the invention provide an enhancement in the reflectance of incident terrestrial solar radiation equal to 1% or greater than currently available by state-of-the-art solar polymer film reflectors.

In one aspect, provided are multilayer reflective films. A reflective film of this aspect comprises an adhesive layer; a metal layer provided above, and optionally in physical contact with, the adhesive layer; a polymeric layer provided above, and optionally in physical contact with, the metal layer; and an abrasion resistant layer provided above, and optionally in physical contact with, the polymeric layer. Another reflective film of this aspect comprises a polymeric layer; a metal layer provided above, and optionally in physical contact with, the polymeric layer; an abrasion resistant layer provided above, and optionally in physical contact with, the metal layer and, optionally, an adhesive layer provided beneath, and optionally in physical contact with the polymeric layer. Optionally, the abrasion resistant layer is a coating. Optionally, the abrasion resistant layer is a hard-coat layer.

In an embodiment, the abrasion resistant layer is an exterior layer with respect to the path of incident solar electromagnetic radiation. In an embodiment, the polymeric layer is an interior layer with respect to the path of incident solar electromagnetic radiation positioned, directly or indirectly, between the abrasion resistant layer and the metal reflective layer. In an embodiment, the metal layer is an interior layer with respect to the path of incident solar electromagnetic radiation positioned, directly or indirectly, between the abrasion resistant layer and the polymer layer.

For some embodiments, positioning the abrasion resistant layer at the exterior of a multilayer reflective film serves to protect underlying layers from, for example, excessive exposure to damaging ultraviolet electromagnetic radiation or from exposure to abrasive conditions which could damage or otherwise degrade the functionality of the underlying layers. Optionally, the abrasion resistant layer has a cut-off wavelength in the ultraviolet region or near ultraviolet regions of the electromagnetic spectrum. For example, the abrasion resistant layer has a cut-off wavelength for some applications less than 385 nm, or in some embodiments less than 382 nm or less than 380 nm. Optionally, the abrasion resistant layer has a cut-off wavelength less than 375 nm, less than 370 nm, less than 365 nm, less than 360 nm, less than 355 nm or less than 350 nm or selected from the range of 355 to 385 nm or selected from the range of 350 nm to 365 nm.

In embodiments, providing an abrasion resistant layer with a cut-off wavelength less than 385 nm, for example, allows the abrasion resistant layer to serve as a screening layer to reduce or otherwise prevent exposure underlying layers to excessive electromagnetic radiation with wavelengths less than the cut-off wavelength. In embodiments, use of abrasion resistant layers having these properties allows, for example, the reflection and collection of terrestrial solar electromagnetic radiation having wavelengths less than 385 nm—electromagnetic radiation that would otherwise be absorbed by an abrasion resistant or ultraviolet screening layer with a cut-off wavelength greater than those of the abrasion resistant layers described herein. Optionally, a reflective film of this aspect has a reflectivity spectrum for incident solar electromagnetic radiation that includes a contribution from electromagnetic radiation having wavelengths between 385 nm and the cut-off wavelength.

In embodiments, the abrasion resistant layer absorbs a majority of incident ultraviolet electromagnetic radiation having a wavelength less than the cut-off wavelength, for example a majority of incident terrestrial solar ultraviolet radiation having a wavelength less than the cut-off wavelength. In embodiments, the abrasion resistant layer has an absorptance of greater than or equal to 50% for electromagnetic radiation (e.g. ultraviolet electromagnetic radiation) having a wavelength less than the cut-off wavelength, for example incident terrestrial solar radiation having a wavelength less than the cut-off wavelength. For some applications, the absorptance of the abrasion resistant layer increases to greater than or equal to 90% for electromagnetic radiation having a wavelength less than 5 to 10 nm below the cut-off wavelength. Optionally, the abrasion resistant layer protects underlying metal layers, polymeric layers and/or adhesive layers by reducing or eliminating their exposure to electromagnetic radiation having wavelengths less than the cut-off wavelength. In embodiments, the abrasion resistant layer transmits a majority of incident electromagnetic radiation having a wavelength greater than the cut-off wavelength, for example, a majority of electromagnetic radiation, such as incident terrestrial solar electromagnetic radiation, having a wavelength between the cut-off wavelength and 2.5 μm. In embodiments, the abrasion resistant layer has a transmittance of greater than or equal to 50% for electromagnetic radiation having a wavelength greater than the cut-off wavelength or selected between the cut-off wavelength and 2.5 μm, or a transmittance of greater than or equal to 50% for incident terrestrial solar electromagnetic radiation having a wavelength greater than the cut-off wavelength.

A wide range of materials are useful in abrasion resistant layers of the reflective films of the invention. In some embodiments, for example, the abrasion resistant layer comprises a polymer, an acrylate, an acrylic, a polyolefin, a cyclic olefin polymer, a cyclic olefin copolymer, a thermoplastic, nano-particle coatings, sol gel coatings or any combination of these. Useful abrasion resistant layers include, but are not limited to, those comprising a UV cured acrylate, poly(methylmethacrylate) (PMMA), ethylene-norbornene copolymer, polynorbornene, Zeonex®, Zeonor®, CR-39, copolymerized styrene and methyl methacrylate, NAS®, ZYLAR® and any combination of these.

Useful abrasion resistant layers include those optionally comprising one or more ultraviolet absorbing compounds, for example distributed in a supporting medium such as a polymer-containing layer. Exemplary ultraviolet absorbing compounds include, but are not limited to, oxanilide, benzophenone, HP triazine, benzotriazole, formamidine and any derivatives of these. Specific ultraviolet absorbing compounds useful with the abrasion resistant layers described herein include, but are not limited to: 2,4-Di hydroxybenzophenone, 2-hydroxy-4-(octyloxy)benzophenone, 2-Hydroxy-4-methoxybenzophenone, α-[3-[3-(2H-benzotriazol-2-yl)-5-(1,1-dimethylethyl)-4-hydroxyphenyl]-1-oxopropyl]-ω-hydroxypoly(oxo-1,2-ethanediyl), α-[3-[3-(2H-benzotriazol-2-yl)-5-(1,1-dimethylethyl)-4-hydroxyphenyl]-1-oxopropyl]-ω-[3-[3-(2H-benzotriazol-2-yl)-5-(1,1-dimethylethyl)-4-hydroxyphenyl]-1-oxopropyl]-poly(oxy-1,2-ethanediyl), 2-(3,5-Di-tert-butyl-2-hydroxyphenyl)-2H-benzotriazole, 2-(3-tert-Butyl-2-hydroxy-5-methylphenyl)-5-chloro-2H-benzotriazole, 2-(2'-Hydroxy-3',5'-di-tert-butylphenyl)-5-chlorobenzotriazole, 2-(2-Hydroxy-3,5-dipenryl-phenyl)benzotriazole, 2-(2H-Benzotriazol-2-yl)-4-(1,1,3,3-tetramethylbutyl)phenol, 2-(2-Hydroxy-5-methylphenyl)benzotriazole and N-(Ethoxycarbonylphenyl)-N'-Methyl-N'-Phenylformamidine and any derivatives, combinations or variants of these. Optionally, the abrasion resistant layer comprises combinations of two or more ultraviolet absorbing compounds.

In some embodiments, for example, the abrasion resistant layer comprises a combination of ultraviolet absorbing compounds selected to provide overall optical properties of the reflective film beneficial for a specific application, such as concentrating solar power. In embodiments, a combination of two or more ultraviolet absorbing compounds is useful for adjusting the exact drop-off shape of the absorptance profile of the abrasion resistant layers. In embodiments, concentrations and cut-off wavelengths for various ultraviolet absorbing compounds are independently selected so as to provide a specific absorptance profile below the cut-off wavelength of the abrasion resistant coating. Optionally, at least one of the one or more ultraviolet absorbing compounds has a cut-off wavelength less than 385 nm, 375 nm, 370 nm, 365 nm, 360 nm, 355 nm or 350 nm or selected from the range of 355 to 385 nm or selected from the range of 350 nm to 365 nm.

The absorption of electromagnetic radiation by the abrasion resistant layer is generally governed by Beer's Law for some applications. Factors that impact the absorption of electromagnetic radiation include the thickness of the abrasion resistant layer and the concentration of ultraviolet absorbers, such as ultraviolet absorbing compounds, comprising the abrasion resistant layer. Optionally, the abrasion resistant layer has a thickness selected from the range of 1 μm to 5 μm. Optionally, the abrasion resistant layer has a thickness selected from the range of 1 μm to 10 μm. Optionally, the abrasion resistant layer has a thickness selected from the range of 2 μm to 10 μm. Optionally, the abrasion resistant layer has a thickness selected from the range of 5 μm to 10 μm. Optionally, the abrasion resistant layer has a thickness selected from the range of 10 μm to 15 μm. Optionally, the abrasion resistant layer has a thickness selected from the range of 15 μm to 20 μm. Optionally, the concentration of one or more ultraviolet absorbing compounds comprising the absorption resistant layer is selected from the range of 0.1% to 5% by weight. Optionally, the concentration of one or more ultraviolet absorbing compounds comprising the absorption resistant layer is selected from the range of 0.5% to 5% by weight. Optionally, the concentration of one or more ultraviolet absorbing compounds comprising the absorption resistant layer is selected from the range of 0.1% to 2% by weight. Optionally, the concentration of one or more ultraviolet absorbing compounds comprising the absorption resistant layer is selected from the range of 1% to 5% by weight. Optionally, the concentration of one or more ultraviolet absorbing compounds comprising the absorption resistant layer is selected from the range of 2% to 5% by weight. In an embodiment, the concentrations of one or more ultraviolet absorbing compounds comprising the abrasion resistant layer are selected so as to provide a cut-off wavelength to the abrasion resistant layer, such as a cut-off wavelength less than 385 nm or less than 380 nm. Optionally, one or more ultraviolet absorbing compounds are uniformly distributed in the abrasion resistant layer, for example, having a concentration throughout the layer within a factor of 0.8 to 1.2 of the average concentration. Optionally, one or more ultraviolet absorbing compounds are non-uniformly distributed in the abrasion resistant layer, for example, having a spatial distribution for a specific application (e.g., a functionally graded coating having enhanced concentration at the surface).

In embodiments, abrasion resistant layers may have a tendency to separate from a directly underlying layer, for example, if covalent or non-covalent forces between the abrasion resistant layer and directly underlying layer are insufficient to maintain full adhesion and bonding between the layers. Thus, a multilayer reflective film of this aspect optionally further comprises an adhesion-promoting layer provided below, and optionally in physical contact with, the abrasion resistant layer. In embodiments, the adhesion-promoting layer comprises an interlayer, for example a separate layer between an abrasion resistant layer and an underlying polymeric layer or metal layer. In embodiments, the adhesion-promoting layer comprises a region of a polymeric layer or metal layer that has undergone surface treatment, such as a plasma treatment or a corona discharge treatment. Adhesion-promoting layers of this aspect serve to enhance the covalent or non-covalent bonding between the materials of the abrasion resistant layer and the materials of the adhesion-promoting layer or underlying layers. For example, surface treatment of a polymeric layer or metal layer optionally increases covalent bonding established between the abrasion resistant layer and the polymeric layer or metal layer when the abrasion resistant layer is applied to the polymeric layer or metal layer. In some embodiments, a surface treatment results in an increase in surface area when compared to the surface area before the surface treatment. Such an increase in surface area can optionally result in stronger adhesion of an abrasion resistant layer to a treated surface when compared with a non-treated surface.

Metal layers useful with the multilayer reflective films of this aspect include those comprising silver or an alloy thereof. Optionally, a reflective film further comprises a second metal protective layer, such as copper, chromium, nickel or alloys thereof in combination with a metal layer comprising a silver layer or alloy thereof. In use in multilayer reflective films, the metal layer is optionally exposed to incident solar radiation having wavelengths selected from the range of 350 nm to 385 nm as well as incident solar radiation having wavelengths within the range of 385 nm and 2.5 µm. Optionally, a reflective film further comprises a single or multilayer dielectric stack above the metal layer. Dielectric stack layers are optionally useful to enhance the reflectivity of the multilayer reflective films for at least a region of the electromagnetic spectrum.

In certain circumstances, a metal layer, such as a silver layer or an alloy thereof, transmits some electromagnetic radiation, for example a small amount, such as less than 1% or less than 0.1% of incident electromagnetic radiation, thus exposing underlying layers, such as adhesive layers or polymeric layers, to the transmitted electromagnetic radiation. For some embodiments where the multilayer films of the invention are used for solar collection or solar reflection applications, even this small amount of transmission can degrade the underlying layers. Particularly, as the multilayer films of some embodiments are exposed to incident solar electromagnetic radiation over long time scales, this long exposure to small amounts of electromagnetic radiation including ultraviolet electromagnetic radiation can damage underlying layers. Thus, a multilayer reflective film of this aspect optionally further comprises a backside metal protective layer provided below, and optionally in physical contact with, the metal layer. Useful backside metal protective layers include, but are not limited to those comprising copper, chromium, nickel or any alloy of these. Use of backside metal protective layers, in embodiments, serves to enhance the reflectivity of an overlying metal layer. Use of backside metal protective layers, in embodiments, provides an additional absorbing layer beneath the metal layer, useful for screening underlying layers from radiation transmitted through the overlying metal layer. In embodiments, backside metal protective layers provide an enhanced protection to underlying layers, such as a polymeric layer or an adhesive layer, from excessive exposure to damaging electromagnetic radiation, such as ultraviolet electromagnetic radiation. Optionally, the metal layer itself further comprises a backside metal protective layer, such as copper, chromium, nickel or alloys thereof. Optionally, the metal layer comprises a multilayer including a backside metal protective layer and a silver layer. In certain embodiments, the metal layer comprises a backside metal protective layer above the adhesive layer and a silver layer above the backside metal protective layer. In other embodiments, the metal layer comprises a backside metal protective layer above the polymeric layer and a silver layer above the backside metal protective layer.

In an embodiment, the purity of the metal layer, such as a silver and/or backside metal protective layer, is greater than or equal to 99.999%. Optionally, the purity of a metal layer and/or a backside metal protective layer, is less than or equal to 99.999%. Useful metal layers include, but are not limited to, those formed by thin film deposition methods, such as physical vapor deposition, chemical vapor deposition and/or sputtering. Exemplary metal layers have a thickness selected from the range of 0.01 µm to 0.15 µm. In some embodiments, for example, a metal has an overall thickness selected from the range of 0.05 µm to 0.15 µm. In some embodiments, a metal layer including multiple metal layers has an overall thickness selected from the range of 0.05 µm to 0.25 µm.

A wide range of polymers are useful in polymer layers of the reflective films of the invention. Polymeric layers useful with the multilayer reflective films of this aspect include, but are not limited to, those comprising a polyester, for example polyethylene terephthalate (PET). Exemplary polymeric layers have a thickness selected from the range of 10 µm to 130 µm.

A wide range of adhesives are useful in adhesive layers of the reflective films of the invention. Adhesive layers useful with the multilayer reflective films of this aspect include, but are not limited to, those comprising a pressure sensitive adhesive. Optionally, films of this aspect further comprise a release liner. Optionally, the release liner is positioned beneath the adhesive layer. Optionally, the release liner is positioned in physical contact with the adhesive layer. Exemplary adhesive layers include those having a thickness selected from the range of 10 µm to 60 µm.

Reflective films of this aspect include those which are highly reflective within the terrestrial solar spectrum, such as within the wavelength range of 300 nm to 2.5 µm or within the wavelength range between a cut-off wavelength of an abrasion resistant layer and 2.5 µm. Optionally, the reflective film is more than 85% reflective, optionally more than 90% reflective, and optionally more than 95% reflective within the wavelength range between a cut-off wavelength of the abrasion resistant layer and 2.5 µm.

Optionally, reflective films of this aspect do not comprise an acrylic layer. For example, in one embodiment, a reflective film does not include an acrylic layer between the polymeric layer and the abrasion resistant layer. Optionally, the adhesive layer and the metal layer are in physical contact. Optionally, the metal layer and the polymeric layer are in physical contact. Optionally, the abrasion resistant layer and the polymeric layer are in physical contact. Optionally, the abrasion resistant layer and the metal layer are in physical contact.

In one embodiment, the reflective film consists of or consists essentially of the metal layer, the polymeric layer and the abrasion resistant layer. In one embodiment, the reflective film consists of or consists essentially of the metal layer, the polymeric layer, the abrasion resistant layer and the adhesive layer. In one embodiment, the reflective film consists of or consists essentially of the metal layer, the polymeric layer, the abrasion resistant layer, the adhesive layer and the release liner.

Useful reflective films of this aspect include, but are not limited to, reflective films having a total thickness selected from the range of 10 µm to 130 µm. In embodiments, the reflective film has a solar-weighted hemispherical reflectance that includes a contribution from reflection of electromagnetic radiation having wavelengths less than 385 nm.

The reflective films described herein are useful for a variety of applications. For example, a reflective film is useful for a solar collecting application, for use in concentrating solar energy and for use in generating electricity. The invention includes, concentrating solar energy system or solar collecting system for power generation comprising any of the disclosed reflective films. In an embodiment, for example, a concentrating solar power or collection system of the invention comprises any of the disclosed reflective films provided in a large area form factor. In an embodiment, for example, a concentrating solar power or collection system of the invention comprises any of the disclosed reflective films provided in a curved form factor to provide collection and focusing of incident solar energy onto a heat exchange fluid, such as a heat exchange fluid housed in a central fluid containment vessel. In another aspect, provided are methods of collecting solar radiation. A method of this aspect comprises the steps of positioning a multilayer reflective film to receive incident solar radiation, providing a target in optical communication with the reflective film and reflecting at least a portion of the incident solar radiation to the target.

In another aspect, provided are methods of making a multilayer reflective film. A first method of this aspect comprises the steps of providing a polymer film, providing a metal layer onto a first side of the polymer film, providing an adhesive layer onto the metal layer and providing an abrasion resistant layer onto a second side of the polymer film. A second method of this aspect comprises the steps of providing a polymer film, providing a metal layer onto a first side of the polymer film and providing an abrasion resistant layer onto the metal layer. Optionally, an adhesive layer is provided onto a second side of the polymer film. Useful abrasion resistant layers, metal layers and adhesive layers include those described above. Useful polymer films include polymeric layers described above. Optionally, a multilayer reflective film is constructed using a roll-to-roll processing method.

In another aspect, provided are abrasion resistant coatings. An embodiment of this aspect comprises an acrylic and one or more ultraviolet absorbing compounds. Optionally, at least one of the ultraviolet absorbing compounds has a cut-off wavelength less than 385 nm or selected from the range of 345 to 385 nm. Useful ultraviolet absorbing compounds include, but are not limited to, oxanilide, benzophenone, HP triazine, benzotriazole, formamidine and any derivatives of these. Useful specific ultraviolet absorbing compounds include, but are not limited to, 2,4-Dihydroxybenzophenone, 2-hydroxy-4-(octyloxy)benzophenone, 2-Hydroxy-4-methoxybenzophenone, α-[3-[3-(2H-benzotriazol-2-yl)-5-(1,1-dimethylethyl)-4-hydroxyphenyl]-1-oxopropyl]-ω-hydroxypoly(oxo-1,2-ethanediyl), α-[3-[3-(2H-benzotriazol-2-yl)-5-(1,1-dimethylethyl)-4-hydroxyphenyl]-1-oxopropyl]-ω-[3-[3-(2H-benzotriazol-2-yl)-5-(1,1-dimethylethyl)-4-hydroxyphenyl]-1-oxopropyl]-poly(oxy-1,2-ethanediyl), 2-(3,5-Di-tert-butyl-2-hydroxyphenyl)-2H-benzotriazole, 2-(3-tert-Butyl-2-hydroxy-5-methylphenyl)-5-chloro-2H-benzotriazole, 2-(2'-Hydroxy-3',5'-di-tert-butylphenyl)-5-chlorobenzotriazole, 2-(2-Hydroxy-3,5-dipenryl-phenyl)benzotriazole, 2-(2H-Benzotriazol-2-yl)-4-(1,1,3,3-tetramethylbutyl)phenol, 2-(2-Hydroxy-5-methylphenyl)benzotriazole and N-(Ethoxycarbonylphenyl)-N'-Methyl-N'-Phenylformamidine.

In embodiments, a method of making an abrasion resistant coating of this aspect comprises the steps of identifying a cut-off wavelength for the abrasion resistant coating, such as a cut-off wavelength less than 385 nm or selected from the range of 345 to 385 nm; selecting a first ultraviolet absorbing compound having the cut-off wavelength; and providing the first ultraviolet absorbing compound into an acrylic mixture. Optionally, a method of making an abrasion resistant coating further comprises a step of selecting a concentration of the ultraviolet absorbing compound in the acrylic mixture, such that the step of providing the ultraviolet absorbing compound into an acrylic mixture comprises providing the ultraviolet absorbing compound in to the acrylic mixture at the selected concentration. Optionally, the abrasion resistant coating comprises one or more additional ultraviolet absorbing compounds. In an embodiment, a method of making an abrasion resistant coating further comprises a step of selecting concentrations of the one or more additional ultraviolet absorbing compounds, where the step of providing the one or more additional ultraviolet absorbing compounds comprises providing the one or more additional ultraviolet absorbing compounds into the acrylic mixture at the selected concentrations.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

BRIEF DESCRIPTION OF THE DRAWINGS

FIG. 10 illustrates bond strengths and wavelengths required for breaking various organic bonds.

DETAILED DESCRIPTION

In general the terms and phrases used herein have their art-recognized meaning, which can be found by reference to standard texts, journal references and contexts known to those skilled in the art. The following definitions are provided to clarify their specific use in the context of the invention.

"Cut-off wavelength" refers to a wavelength of electromagnetic radiation at which a composition or structure, such as the screening layers of a reflective film, layer or coating, exhibits a transmittance value of 50% of the maximum transmittance for a first spectral region including wavelengths greater than the cut-off wavelength, and for which transmittance values for a second spectral region including wavelengths less than the cut-off wavelength are less than 50% of the maximum transmittance of the spectral region. In embodiments, cut-off wavelength refers to the wavelength at which an abrasion resistant layer has a transmittance value that is 50% of the maximum transmittance of the abrasion resistant layer over the terrestrial solar spectrum or portion thereof, such as the visible region of the terrestrial solar spectrum, and wherein the abrasion resistant layer exhibits a transmittance less than 50% for wavelengths of light of the terrestrial solar spectrum, or portion thereof, less than the cutoff wavelength, for example, by exhibiting a transmittance less than 50% for wavelength of light below the cut-off wavelength in the ultraviolet region of the terrestrial solar spectrum. Some abrasion resistant layers, for example, exhibit a change in transmittance characterized by high transmittance values (e.g., greater than 80% or greater than 90%) in the visible region of the terrestrial solar spectrum and a rapid fall-off in transmittance in the near ultraviolet region, for example exhibiting a change in transmittance approximating a step function, wherein the cut-off wavelength corresponds to a point on the fall-off for which the transmittance is 50% of the maximum value in the visible region of the terrestrial solar spectrum. For some abrasion resistant layers, for example, the transmittance values for wavelengths of the terrestrial solar spectrum 5 nanometers, or optionally 10 nanometers, below the cut-off wavelength are significantly less than 50%, for example less than 10%, and optionally less than 1% and optionally for some embodiments less than 0.1%. For some abrasion resistant layers, for example, the transmittance values for wavelengths of the terrestrial solar spectrum 5 nanometers, or optionally 10 nanometers, above the cut-off wavelength are significantly greater than 50%, for example greater than 80%, optionally greater than 90%, and optionally greater than 95%.

Figure 9:
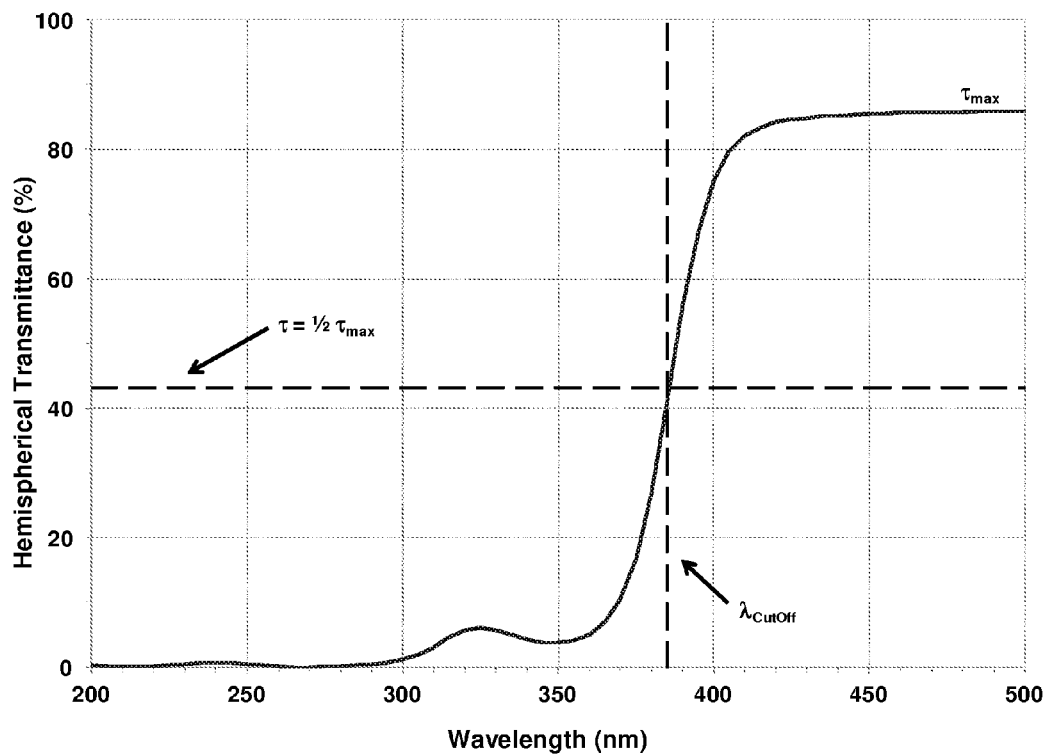
FIG. 9 provides data showing spectral hemispherical transmittance of an abrasion resistant layer coated onto a quartz plate substrate.

In certain embodiments, a cut-off wavelength refers to an ultraviolet wavelength of the terrestrial solar spectrum at which the transmittance of a composition or a structure, such as the abrasion resistant layer of a reflective film, layer or coating, is equal to 50% of the maximum transmittance value for the composition or structure in the visible region of the terrestrial solar spectrum. FIG. 9 illustrates an exemplary embodiment identifying the cut-off wavelength ($\lambda_{CutOff}$) of an abrasion resistant layer as having a transmittance value equal to ½ of the maximum transmittance value ($\tau_{max}$) of the abrasion resistant layer in the visible region of the spectrum.

In embodiments, 50% or more of incident radiation having wavelengths above the cut-off wavelength are transmitted through a composition or a structure, such as a film, layer or coating, having the cut-off wavelength. For example, for some embodiments of the present invention an abrasion resistant layer has a transmittance of greater than or equal to 60%, greater than or equal to 70%, greater than or equal to 80%, greater than or equal to 90% or greater than or equal to 95% for electromagnetic radiation having a wavelength greater than the cut-off wavelength or selected between the cut-off wavelength and 2.5 µm.

"Ultraviolet absorbing compound" refers to a composition which absorbs ultraviolet electromagnetic radiation. In embodiments, ultraviolet absorbing compounds are added to mixtures, films or optically transparent materials to provide absorptance (and thereby prevent or reduce the transmittance) of at least a portion of ultraviolet electromagnetic radiation through the mixtures, films or optically transparent materials. Useful ultraviolet absorbing compounds include those exhibiting a cut-off wavelength selected from the range of 345 nm to 385 nm.

"Abrasion resistant" refers to a property of a layer, coating or material to withstand damage sustained through friction or wear, such as damaged sustained by scratching or scuffing. In embodiments, useful abrasion resistant materials include acrylics, acrylic mixtures, polyolefins, cyclic olefin polymers, cyclic olefin copolymers, thermoplastics, polyesters, PETs. Abrasion resistance can be assessed using standardized methods, such as ASTM Standard D4060 or variations thereof. In the context of reflective films having an abrasion resistant coating, useful abrasion resistant coatings include, but are not limited to, those abrasion coatings, which when damaged through friction or wear, that do not impact or have a minimal impact on a specular reflectance of the reflective film, such as a change in specular reflectance less than 2%.

"Absorptance" refers to a property of an object or material that absorbs light. In general, the term absorptance refers to the percentage of light absorbed by the object or material. In embodiments, the term absorptance refers to the percentage of light absorbed by the object or material at a specified wavelength or within a specified wavelength range.

In embodiments, the present invention provides reflective films in which an abrasion resistant layer has an absorptance of greater than or equal to 80%, greater than or equal to 90% or greater than or equal to 95% for at least a portion of electromagnetic radiation having a wavelength less than the abrasion resistant layer's cut-off wavelength. Optionally, an absorptance profile of an abrasion resistant layer is selected such that the absorptance of the abrasion resistant layer is greater than 90% for electromagnetic radiation, for example terrestrial solar electromagnetic radiation, having wavelengths less than 5 or 10 nm below the abrasion resistant layer's cut-off wavelength. Such an absorptance profile can be selected, for example, by adjusting a concentration of one or more ultraviolet absorbing compounds present in the abrasion resistant layer.

"Reflectance" and "percent reflective" refer to a property of an object, material, layer, film or surface. In general, the term reflectance refers to the percentage of light reflected by the object or material. In embodiments, the term reflectance refers to the percentage of light reflected by the object or material at a specified wavelength or within a specified wavelength range.

For example, for certain embodiments of the present invention a reflective film is more than 90% reflective within the wavelength range between a cut-off wavelength of an abrasion resistant layer and 2.5 µm, such as within the range of 285 nm to 2.5 µm. Optionally, a reflective film is more than 95% reflective within the wavelength range between a cut-off wavelength of an abrasion resistant layer and 2.5 µm.

"Solar-weighted hemispherical reflectance" refers to a standardized measure characterizing the quality and performance of solar reflectors. In certain embodiments, specific wavelength regions contribute to and comprise a portion of the solar-weighted hemispherical reflectance of a solar reflector. In certain cases, specific wavelength regions do not contribute to the solar-weighted hemispherical reflectance of a solar reflector, for example if the electromagnetic radiation in the specific wavelength region is absorbed by the solar reflector.

"Solar radiation" refers to electromagnetic radiation from the sun. "Terrestrial solar radiation" refers to solar radiation that is transmitted through the atmosphere of the Earth. "Incident solar radiation" refers to solar radiation received by a film, mirror or device.

"Polymer" refers to a macromolecule composed of repeating structural units connected by covalent chemical bonds or the polymerization product of one or more monomers, often characterized by a high molecular weight. The term polymer includes homopolymers, or polymers consisting essentially of a single repeating monomer subunit. The term polymer also includes copolymers, or polymers consisting essentially of two or more monomer subunits, such as random, block, alternating, segmented, graft, tapered and other copolymers. Useful polymers include organic polymers, inorganic polymer and/or hybrid polymers and may be in amorphous, semi-amorphous, crystalline or partially crystalline states. Cross linked polymers having linked monomer chains are particularly useful for some applications, such as for abrasion resistant coating (ARCs). Polymers useful in the present methods, devices and device components include, but are not limited to, plastics, thermoplastics and acrylates. Exemplary polymers include, but are not limited to, acetal polymers, cellulosic polymers, fluoropolymers, nylons, polyacrylonitrile polymers, polyamide-imide polymers, polyimides, polyarylates, polybenzimidazole, polybutylene, polycarbonate, polyesters, polyetherimide, polyethylene, polyethylene copolymers and modified polyethylenes, polyketones, poly(methyl methacrylate, polymethylpentene, polyphenylene oxides and polyphenylene sulfides, polyphthalamide, polypropylene, polyurethanes, styrenic resins, sulfone based resins, vinyl-based resins, rubber (including natural rubber, styrene-butadiene, polybutadiene, neoprene, ethylene-propylene, butyl, nitrile, silicones), acrylic, nylon, polycarbonate, polyester, polyethylene, polypropylene, polystyrene, polyvinyl chloride, polyolefin, polyolefins, cyclic olefin polymers, cyclic olefin copolymers, thermoplastics, polyesters, PETs or any combinations of these. A "polymeric layer" refers to a layer of a reflective film comprising a polymer or consisting essentially of a polymer. Useful polymeric layers include, but are not limited to, polymer films and polymer coatings.

"Optical communication" refers to a relative positioning of two objects such that electromagnetic radiation can be directed directly between the objects or indirectly between the objects, such as through one or more intervening optical elements, for example a lens, a reflector, a filter, a grating, etc.

"Roll-to-roll processing method" refers to a method for forming multilayer films where a roll of film is processed by unwinding the film from a first roll, applying coating layers, joining with additional rolls of film or otherwise processing the film and winding the processed multilayer film onto a second roll.

Figure 1:
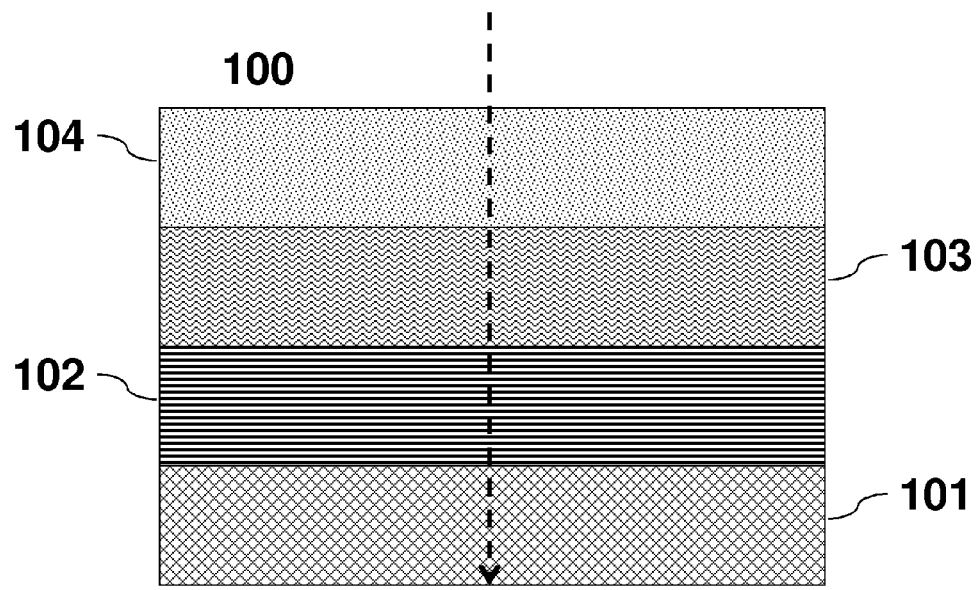
FIG. 1 depicts a multilayer reflective film embodiment.

FIG. 1 shows a cross section of an exemplary multilayer reflective film 100. In this embodiment, the lowest layer 101 comprises an adhesive, the layer immediately above the adhesive layer 101 comprises a metal layer 102, the layer immediately above the metal layer 102 comprises a polymeric layer 103 and the topmost layer comprises an abrasion resistant layer 104. Optionally, a release liner is applied beneath the adhesive, for example to facilitate winding multilayer reflective film 100 onto a roll. In an embodiment, for example, adhesive layer 101 is in physical contact, and optionally directly bonded to (e.g., via covalent bonding, intermolecular forces, Van Der Waals forces, etc.) to metal layer 102. In an embodiment, for example, metal layer 102 is in physical contact, and optionally directly bonded to (e.g., via covalent bonding, intermolecular forces, Van Der Waals forces, etc.) to polymeric layer 103. In an embodiment, for example, polymeric layer 103 is in physical contact, and optionally directly bonded to (e.g., via covalent bonding, intermolecular forces, Van Der Waals forces, etc.) to abrasion resistant layer 104.

Figure 2:
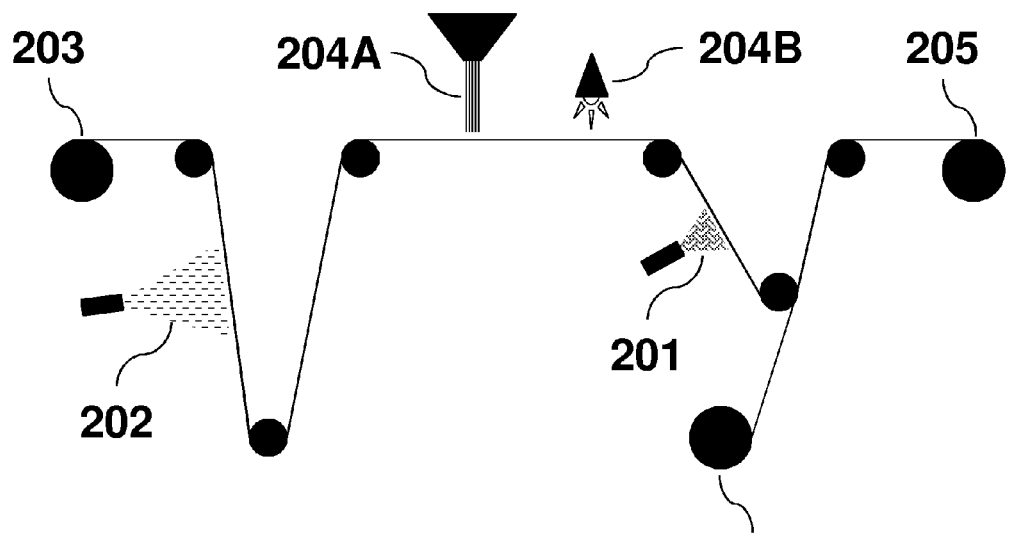
FIG. 2 depicts a roll-to-roll processing method for making a reflective film.

FIG. 2 illustrates a roll-to-roll processing method for making film 100. Initially, a roll 203 of polymer film is provided. As the polymer film is unrolled from roll 203, a metal layer is deposited 202 onto one side of the polymer film during the processing method. An abrasion resistant layer is then applied to the other side of the of the polymer film by applying 204A a layer of uncured abrasion resistant material, followed by UV curing 204B. Finally, an adhesive is applied 201 beneath the metal layer. To facilitate winding the assembled film onto a second roll 205, a release liner from roll 206 is applied beneath the adhesive. Alternative routes for making the films include, but are not limited to, vacuum deposition processes such as sputtering and thermal evaporation and physical and chemical vapor deposition.

Figure 3A:
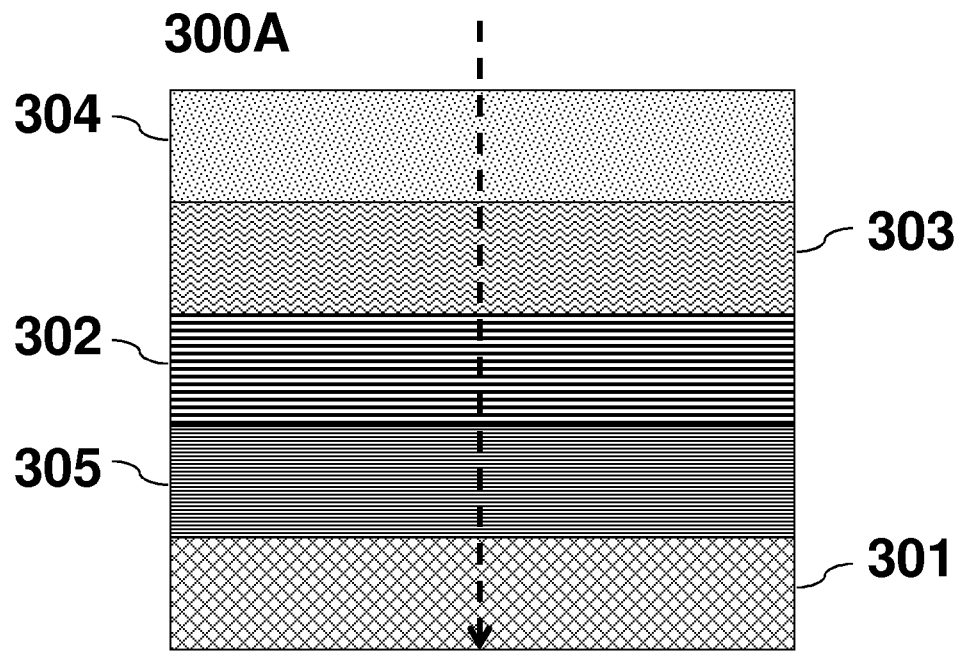
FIGS. 3A-3C depict multilayer reflective film embodiments.
Figure 3B:
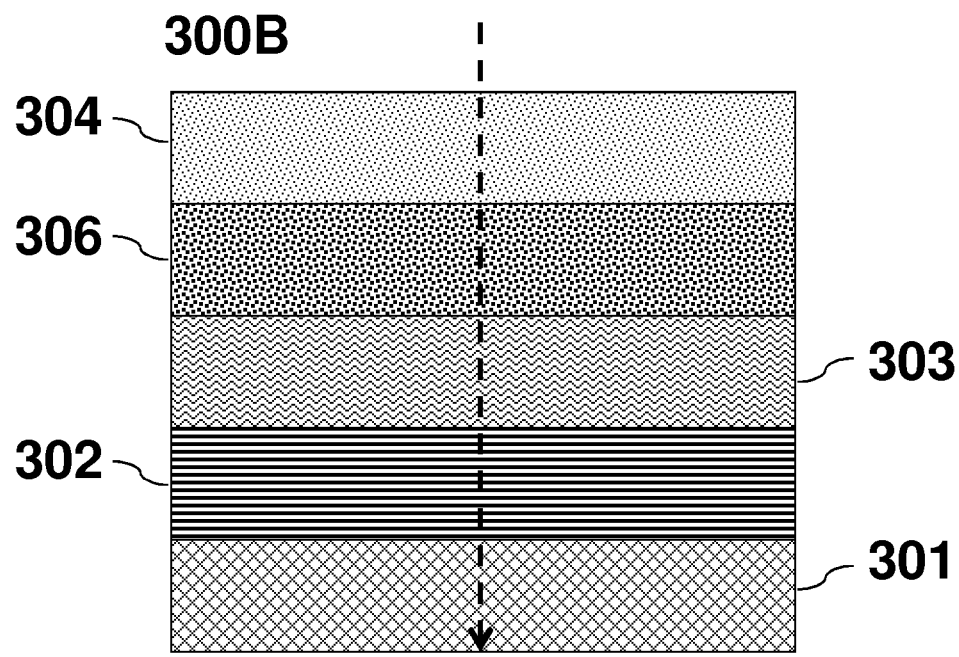
Figure 3C:
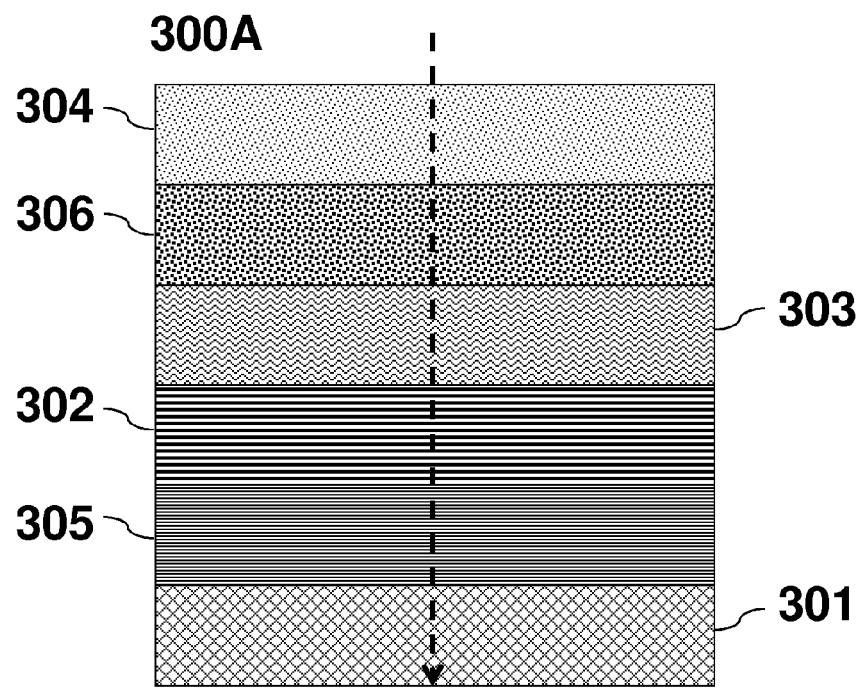

FIG. 3A shows a cross section of an exemplary multilayer reflective film 300A. This film is similar to film 100 shown in FIG. 1, except film 300A further comprises a backside metal protective layer 305 below metal layer 302 and above adhesive layer 301. FIG. 3B shows a cross section of an exemplary multilayer reflective film 300B. This film is similar to film 100 shown in FIG. 1, except film 300B further comprises an adhesion-promoting interlayer 306 below abrasion resistant layer 304 and above polymeric layer 303. FIG. 3C shows a cross section of an exemplary multilayer reflective film 300C. This film is similar to film 100 shown in FIG. 1, except film 300C further comprises both a backside metal protective layer 305 and an adhesion-promoting interlayer 306.

Figure 4:
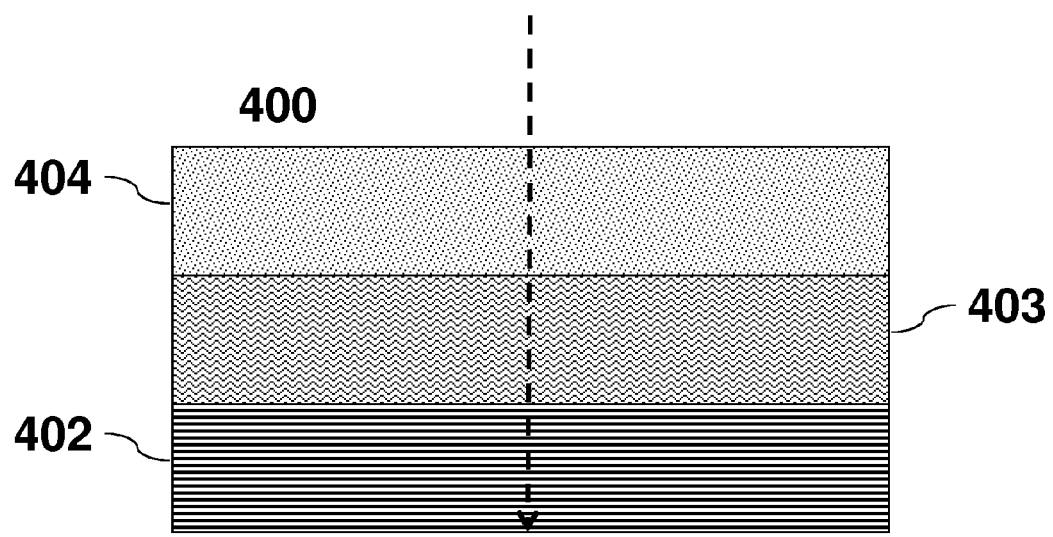
FIG. 4 depicts a multilayer reflective film embodiment.

FIG. 4 shows a cross section of another exemplary multilayer reflective film 400. In this embodiment, the lowest layer comprises a metal layer 402, the layer immediately above the metal layer 402 comprises a polymeric layer 403 and the topmost layer comprises an abrasion resistant layer 404. Optionally, an adhesive layer is applied beneath the polymeric layer, as in film 100. Optionally, a release liner is applied beneath the adhesive layer. In an embodiment, for example, metal layer 402 is in physical contact, and optionally directly bonded to (e.g., via covalent bonding, intermolecular forces, Van Der Waals forces, etc.) to polymeric layer 403. In an embodiment, for example, polymeric layer 403 is in physical contact, and optionally directly bonded to (e.g., via covalent bonding, intermolecular forces, Van Der Waals forces, etc.) to abrasion resistant layer 404.

Figure 5A:
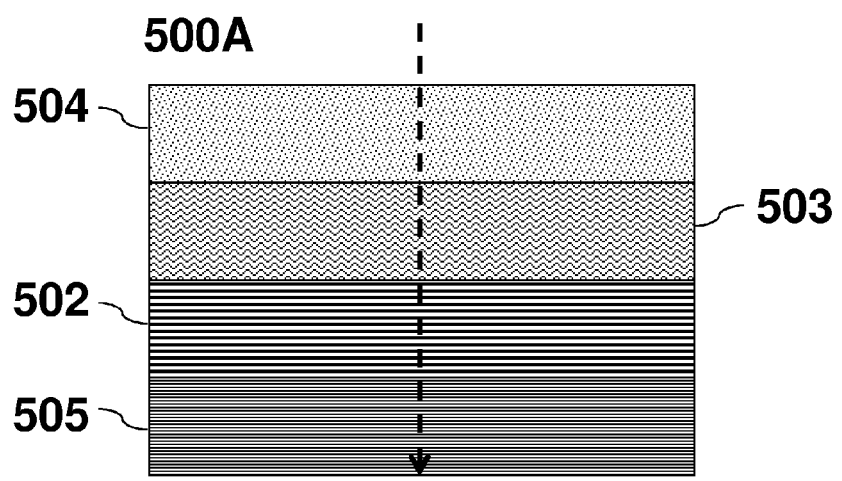
FIGS. 5A-5C depict multilayer reflective film embodiments.
Figure 5B:
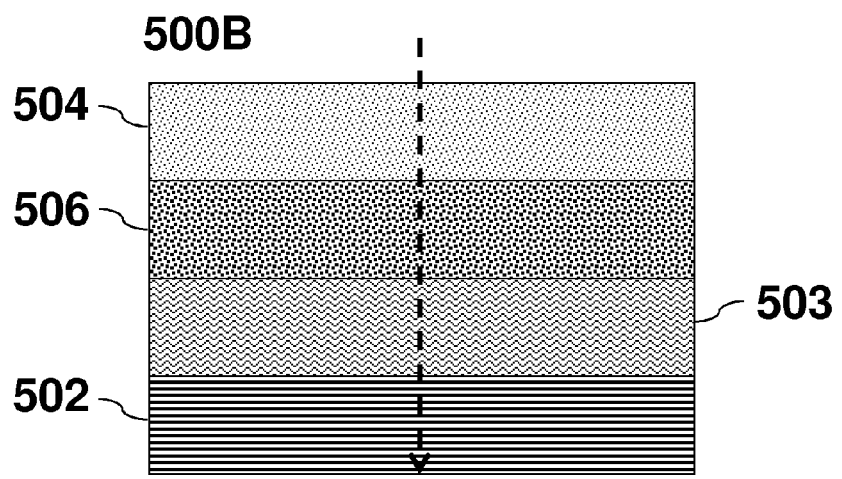
Figure 5C:
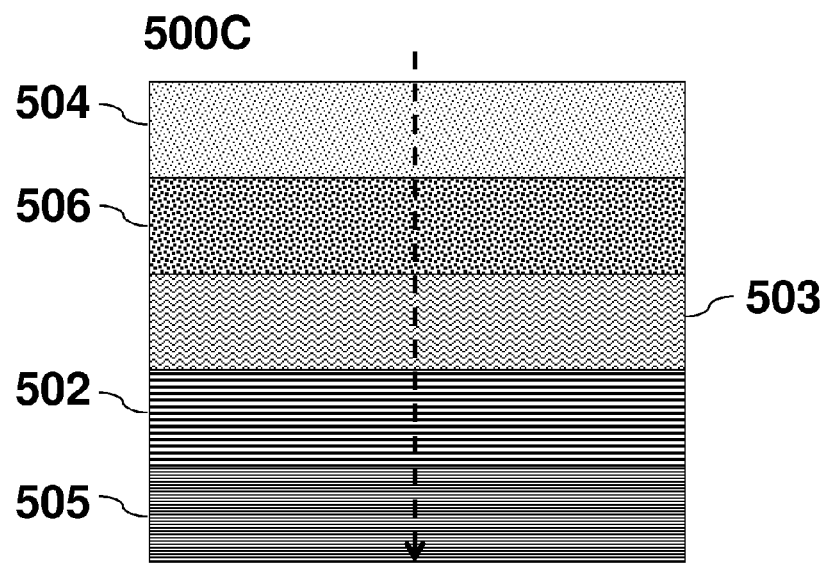

FIG. 5A shows a cross section of an exemplary multilayer reflective film 500A. This film is similar to film 400 shown in FIG. 4, except film 500A further comprises a backside metal protective layer 505 below metal layer 502. FIG. 5B shows a cross section of an exemplary multilayer reflective film 500B. This film is similar to film 400 shown in FIG. 4, except film 500B further comprises an adhesion-promoting interlayer 506 below abrasion resistant layer 504 and above polymeric layer 503. FIG. 5C shows a cross section of an exemplary multilayer reflective film 500C. This film is similar to film 400 shown in FIG. 4, except film 500C further comprises both a backside metal protective layer 505 and an adhesion-promoting interlayer 506.

Figure 6:
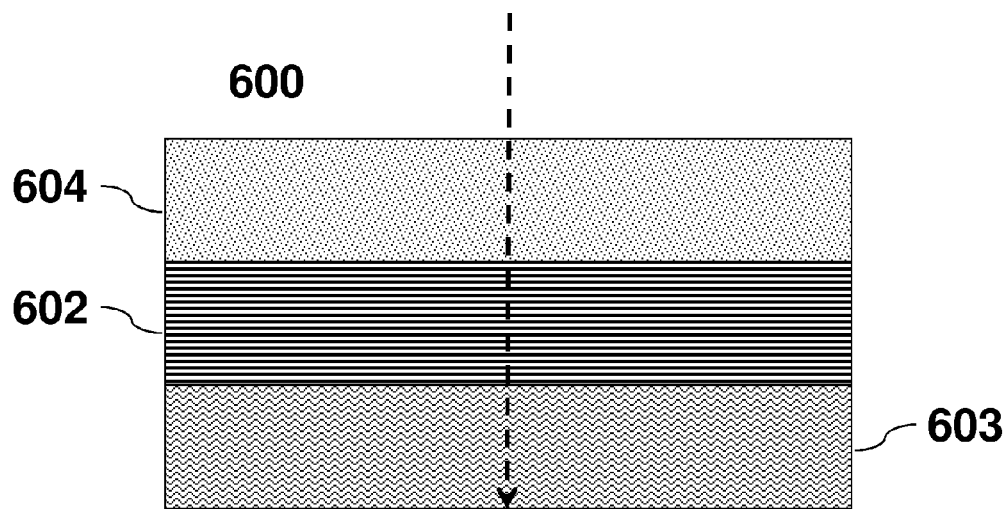
FIG. 6 depicts a multilayer reflective film embodiment.

FIG. 6 shows a cross section of another exemplary multilayer reflective film 600. In this embodiment, the lowest layer 603 comprises a polymeric layer, the layer immediately above the polymeric layer 603 comprises a metal layer 602 and the topmost layer comprises an abrasion resistant layer 604. Optionally, an adhesive layer is applied beneath the polymeric layer. Optionally, a release liner is applied beneath the adhesive layer. In an embodiment, for example, polymeric layer 603 is in physical contact, and optionally directly bonded to (e.g., via covalent bonding, intermolecular forces, Van Der Waals forces, etc.) to metal layer 602. In an embodiment, for example, metal layer 602 is in physical contact, and optionally directly bonded to (e.g., via covalent bonding, intermolecular forces, Van Der Waals forces, etc.) to abrasion resistant layer 604.

Figure 7A:
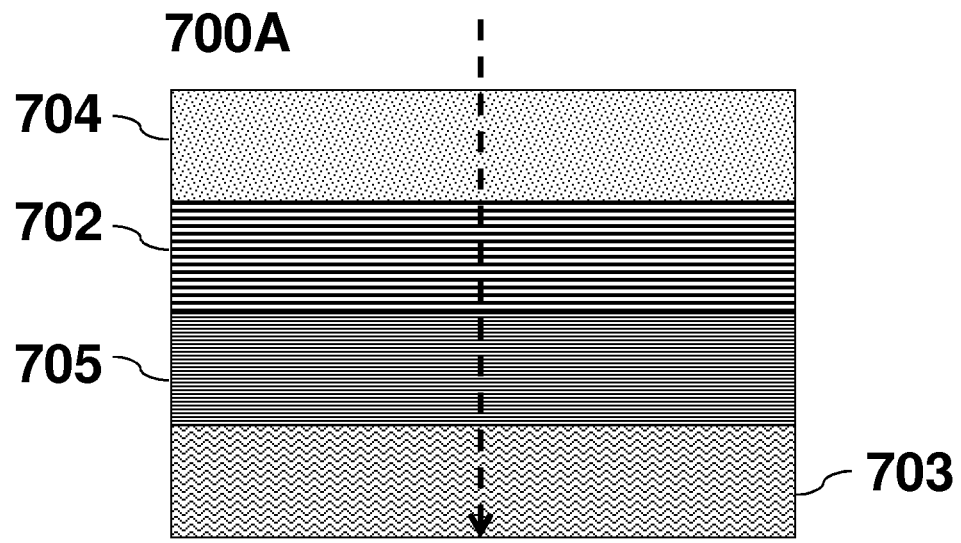
FIGS. 7A-7C depict multilayer reflective film embodiments.
Figure 7B:
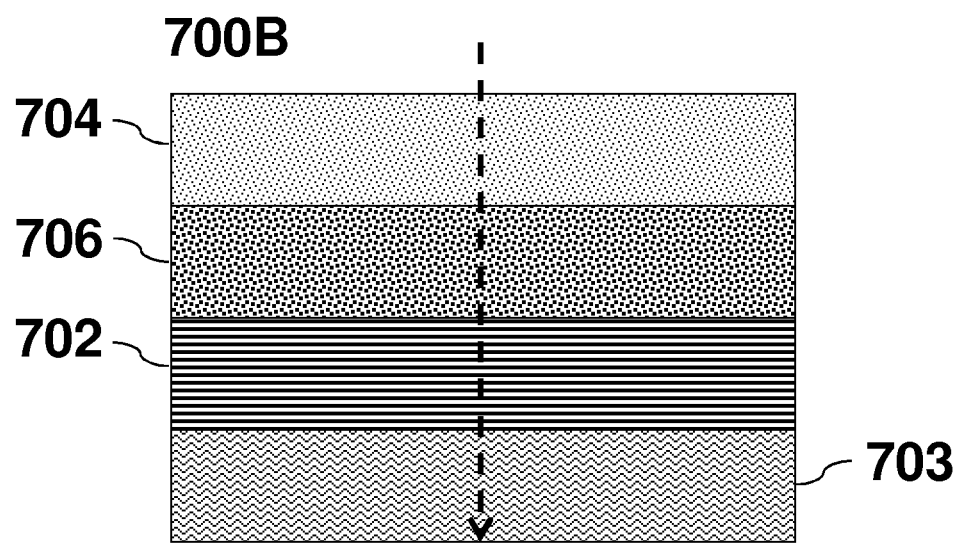
Figure 7C:
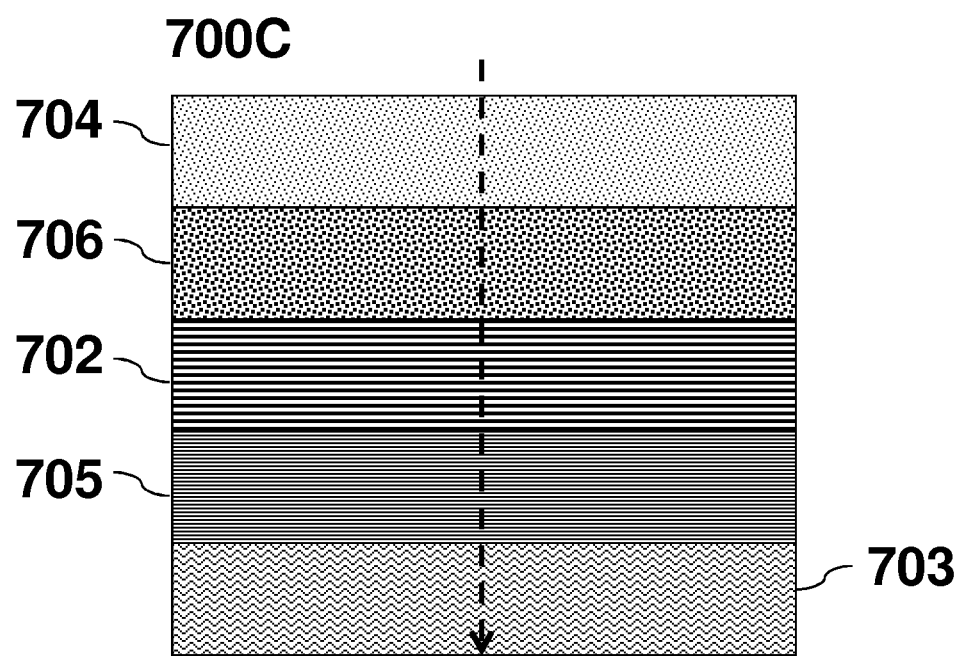

FIG. 7A shows a cross section of an exemplary multilayer reflective film 700A. This film is similar to film 600 shown in FIG. 6, except film 700A further comprises a backside metal protective layer 705 below metal layer 702 and above polymeric layer 703. FIG. 7B shows a cross section of an exemplary multilayer reflective film 700B. This film is similar to film 600 shown in FIG. 6, except film 700B further comprises an adhesion-promoting interlayer 706 below abrasion resistant layer 704. FIG. 7C shows a cross section of an exemplary multilayer reflective film 700C. This film is similar to film 600 shown in FIG. 6, except film 700C further comprises both a backside metal protective layer 705 and an adhesion-promoting interlayer 706.

An example trajectory of incident solar electromagnetic radiation is schematically represented in FIGS. 1, 3A-3C, 4, 5A-5C, 6 and 7A-7C via a dotted arrow, although it will be readily appreciated that a wide range of incident trajectories are useful with the present reflective films and methods. As shown by the example trajectory in these figures, incident solar electromagnetic radiation first interacts with the abrasion resistant layer prior to interaction with subsequent layers in the stack. Accordingly, use of abrasion resistant layers having a selected cut-off wavelength in the disclosed geometries allows for protection of the underlying layer (e.g., metal, polymer and/or adhesive layers) by decreasing, or preventing, transmission of incident electromagnetic radiation capable of substantially degrading the underlying layers. In addition, use of abrasion resistant layers having a selected cut-off wavelength in the disclosed geometries allows for enhanced overall efficiency of reflection by enhancing transmission of wavelengths that are effectively reflected by the underlying layers providing reflection (e.g., the metal layer) without substantially degrading the underlying layers. Therefore, selection of the cut off wavelength of the abrasion resistant layer in the present invention provides significant benefits for solar concentrating power applications The invention may be further understood by the following non-limiting examples.

EXAMPLE 1

Increasing Solar-Weighted Reflectance of Polymer Film Reflectors by Modifying the Screening Profile of UV Absorbing Additives Central to the mirror film concept is the incorporation of ultraviolet (UV) screening layers to protect underlayers from photodegradation. This results in blocking a significant part (over 2.5% of the available terrestrial resource) of the solar spectrum that could otherwise be reflected and thereby increase the solar-weighted reflectance value. Realistic modification of the UV screening functionality can achieve an improvement in reflectance by ~1 to 1.5%. The challenge in such "unscreening" of part of the UV spectrum is to assure that wavebands needed to provide adequate protection of chemical bonds present in the various layers of the reflector construction are not removed so that requisite weatherability of the overall reflector is maintained.

Figure 14:
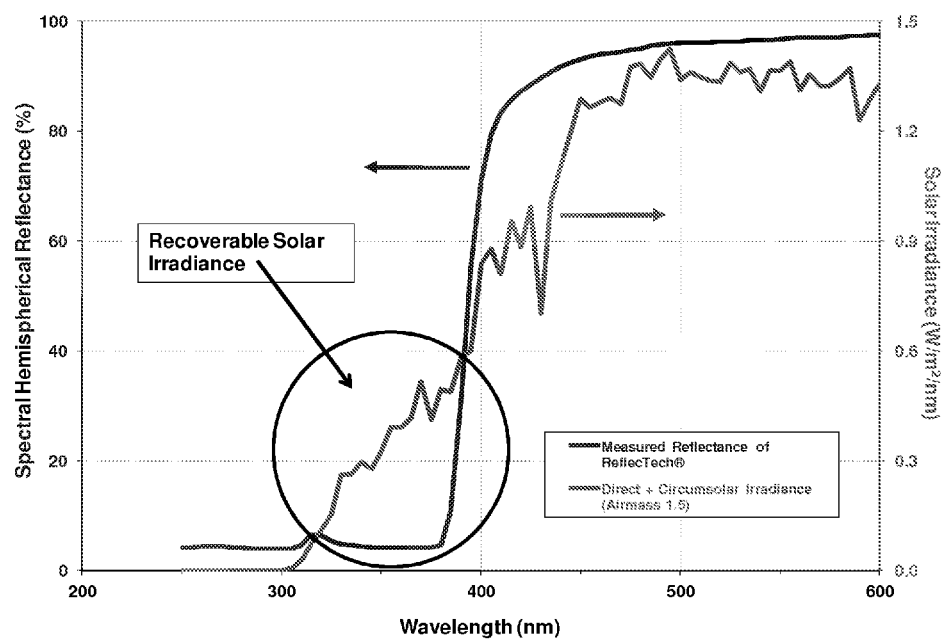
FIG. 14 provides an overlay plot showing: (i) the solar irradiance (W/m²/nm) as a function of wavelength and (ii) spectral hemispherical reflectance (%) as a function of wavelength for a conventional reflective film incorporating a broadband ultraviolet absorber (UVA) package to provide UV resistance to the reflective film.

To illustrate this aspect of the invention, FIG. 14 provides an overlay plot showing: (i) the solar irradiance (W/m$^2$/nm) as a function of wavelength and (ii) spectral hemispherical reflectance (%) as a function of wavelength for a conventional reflective film incorporating a broadband ultraviolet absorber (UVA) package to provide UV resistance to the reflective film. As shown in FIG. 14, a significant amount of the recoverable solar irradiance is not reflected due to the presence of the broadband ultraviolet absorber (UVA) package of conventional reflective films of the art, thereby, decreasing the overall efficiency of such films for concentrating solar power applications. The present invention, therefore, provides reflective films that enhance the recoverable solar irradiance while at the same time maintaining protection of the reflective film from UV initiated degradation.

Figure 8:
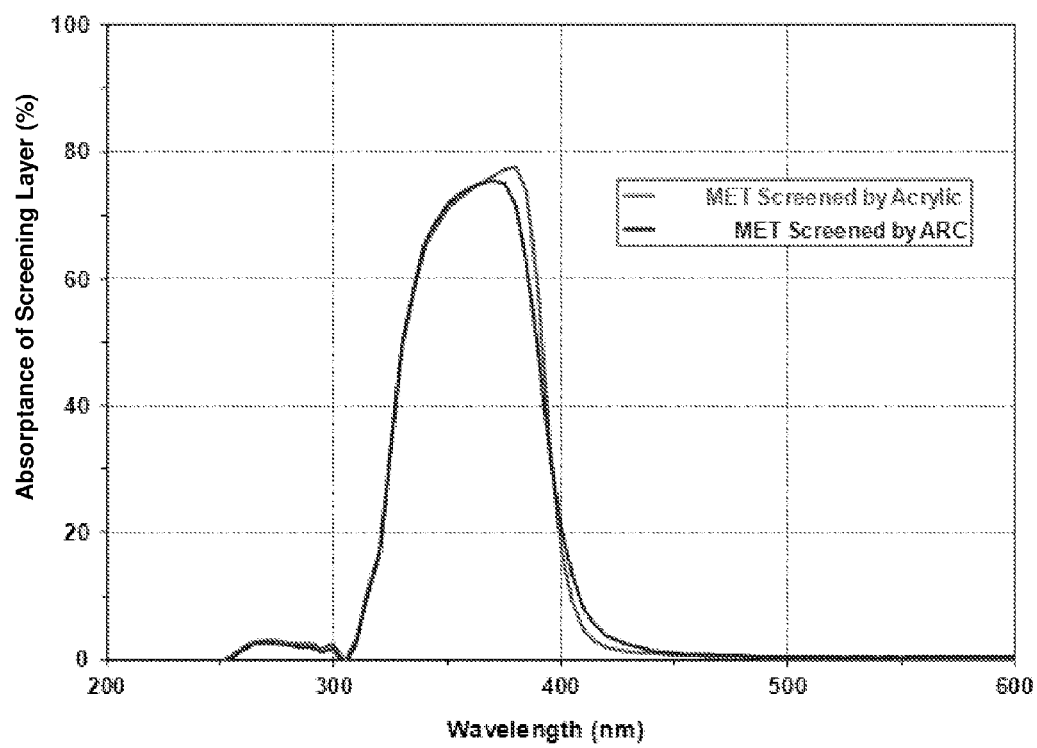
FIG. 8 provides data showing hemispherical absorptance obtained by two reflective film embodiments.

Ultraviolet Absorbers. Commercial mirror film constructions use broadband ultraviolet absorber (UVA) packages to provide UV resistance of the entire stack. In one example, the ultraviolet absorbing additives incorporated into an acrylic film are specifically designed for UV screening and are not required to protect the acrylic itself which is inherently UV stable. In one example, the abrasion resistant coating (ARC) requires ultraviolet absorbers to give itself the long term weatherability required for use with concentrating solar power collector applications. An added benefit of these ultraviolet absorbers is that some abrasion resistant coatings exhibit nearly identical optical screening properties as the acrylic film. FIG. 8 shows the spectral hemispherical absorptance of two reflective film constructions. One case (red line) shows the amount of light absorbed by a laminated UV-screening acrylic film. The other case (blue line) indicates the amount of light absorbed by a UVA-containing ARC coating. The difference in absorptance provides a measure of the UV screening functionality of the respective screening layers. At wavelengths below ~365 nm the two curves overlay almost exactly, indicating that the ultraviolet absorber package used in the abrasion resistant coating provides UV screening nearly identical to the acrylic film over those wavelengths. Between ~365-400 nm the spectral difference between the ARC vs. acrylic film is shifted by about 2.5 nm; such a small shift at these higher UV wavelengths will generally have a minimal effect on weatherability between these two screening layers.

A plot of spectral transmittance of an ARC coated onto quartz is shown in FIG. 9. FIG. 9 shows the spectral hemispherical transmittance with a cut-off wavelength of about 385 nm. Very little structure is exhibited throughout the wavelength region of interest (λ>300 nm) except for a fairly steep shoulder feature that separates a region that is highly absorbing vs. a region that is highly transmitting. The wavelength at which transmittance equals 50% is generally defined as the cut-off wavelength ($\lambda_{CutOff}$), below which transmittance rapidly drops to a near zero value. FIG. 9 indicates that the cut-off wavelength is about 385 nm.

Materials, such as polymers having organic bonds that would otherwise be susceptible to photolytic damage, are thereby afforded some level of UV protection. The cut-off wavelength of the acrylic film used in some reflective films is very close to 385 nm. FIG. 10 provides a list of typical organic bonds and the associated wavelength required to break those bonds. Blanksby and Ellison present a more extensive discussion that includes bond dissociation energies of more than 100 representative organic molecules. The molecular bond strength energy (E) and photon wavelength are related by:

$$\lambda = hc/E, \quad (1)$$

where h is Planck's constant and c is the speed of light. FIG. 10 illustrates a number of organic bond strengths and corresponding photon wavelengths required to break them.

The degree of UV screening protection provided is a function of the optical density of the film or coating. This property is controlled by Beer's Law:

$$\alpha(\lambda) = \epsilon(\lambda) \cdot L \cdot C, \quad (2)$$

where $\alpha(\lambda)$ is the spectral absorbance or optical density, $\lambda$ is wavelength, $\epsilon(\lambda)$ is spectral molar absorptivity or extinction coefficient, L is the thickness of the film or coating and C is the concentration of ultraviolet absorbing additives. The amount of transmitted light, $\tau$, is related to the absorbance by:

$$\tau(\lambda) = 10^{-\alpha(\lambda)} = 10^{-\epsilon(\lambda) \cdot L \cdot C}. \quad (3)$$

Figure 11:
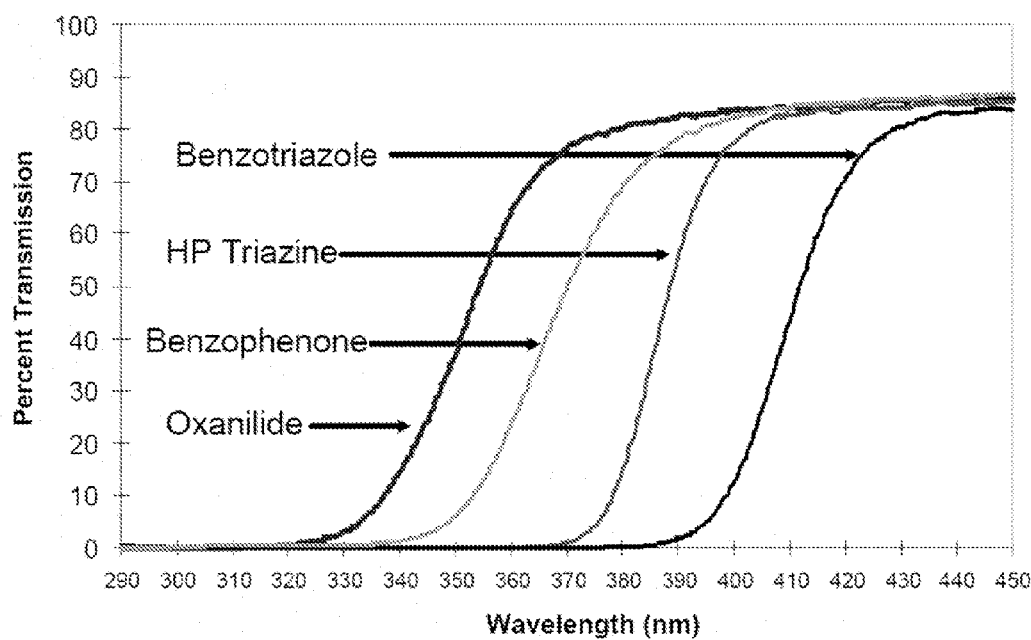
FIG. 11 provides data showing the spectral transmittance properties of various ultraviolet absorber packages.

The extent to which UV photons are blocked or transmitted can therefore be tailored or controlled in three ways. First, $\epsilon(\lambda)$ is an inherent property of the type of UVA that is used. A wide variety of ultraviolet absorber packages exist. For example, the spectral properties of different types of commercial ultraviolet absorber products available from Ciba Specialty Chemicals, a major international supplier of UVA additives, are shown in FIG. 11. As can be seen, the cut-off wavelength can be shifted by choosing different types of ultraviolet absorber products.

Increasing the thickness of the coating or film will exponentially decrease transmittance at all wavelengths. This property can be achieved, for example by using increasingly thick acrylic films. Increasing thickness also increases the longevity of the screening functionality. Successive layers of ultraviolet absorbers provide protection for underlying absorber molecules, thereby allowing downstream ultraviolet absorbers to survive longer.

Figure 12:
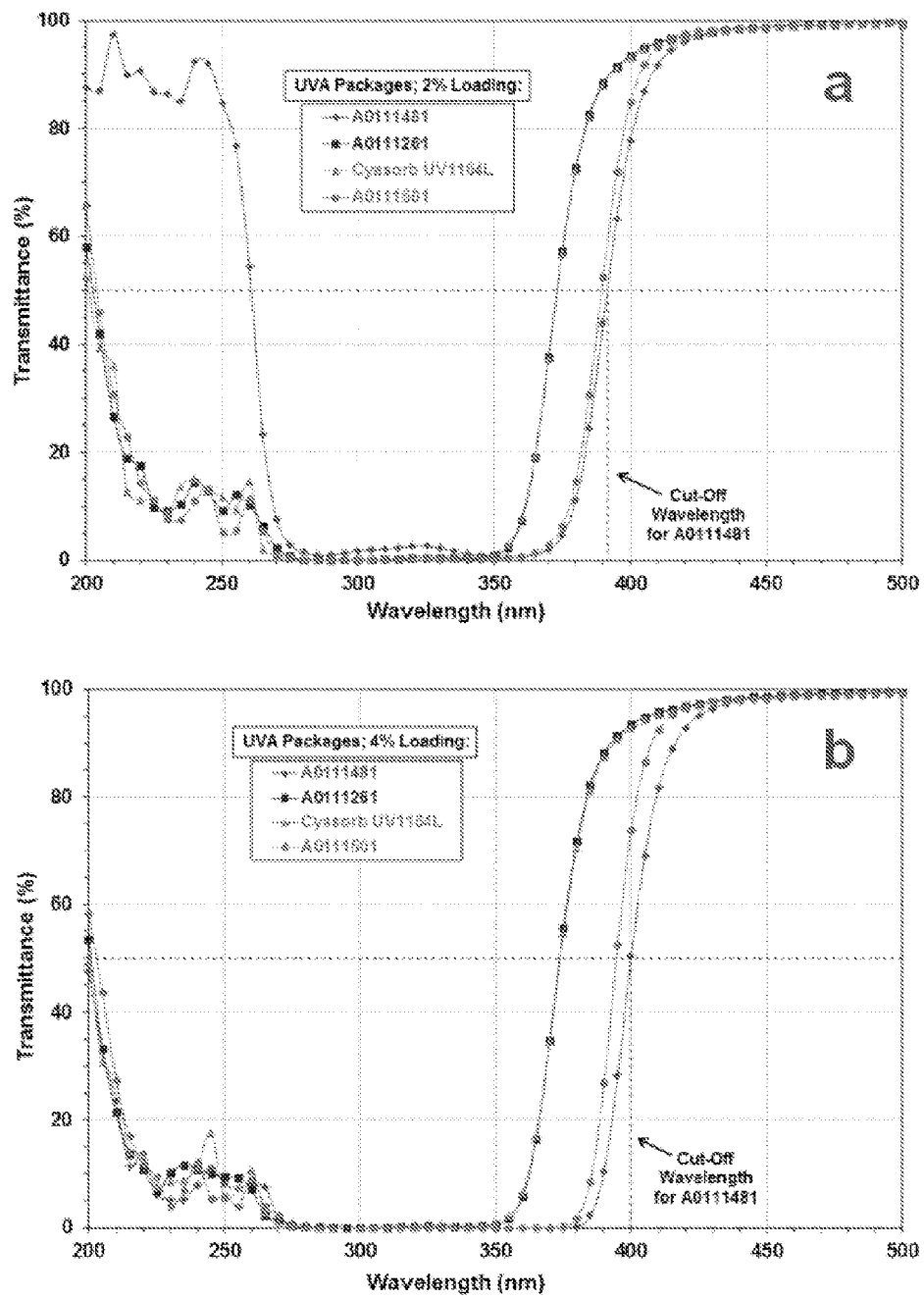
FIGS. 12a and 12b provide data showing transmittance of various ultraviolet absorber packages at two different concentrations/loadings.

Finally, greater loading results in higher concentration of ultraviolet absorbers and, consequently, lower transmittance. This can also effectively shift the cut-off wavelength. For a given ultraviolet absorber package, higher concentration shifts the cut-off wavelength to higher wavelengths. For example, FIG. 12 shows the spectral transmittance properties associated with four ultraviolet absorber packages. FIG. 12a shows the transmittance for abrasion resistant coatings using several ultraviolet absorbers at 2% loading, and FIG. 12b presents data for 4% loading. The cut-off wavelength of the A0111481 UVA package shifts $\lambda_{CutOff}$ from ~390 nm at 2% to ~400 nm at 4%.

Increased UV Reflectance. The solar-weighted hemispherical reflectance (SWHR) can be increased by using a modified ultraviolet absorber package that shifts $\lambda_{CutOff}$ to lower wavelengths. ASTM G173 provides a typical/standard terrestrial solar spectrum as shown in FIG. 14.

The percent of the terrestrial solar spectrum resource that can be regained by shifting the cut-off wavelength to lower wavelengths ($P_{SR}$) is the total amount of sunlight available below 385 nm (2.62%) times the power density between $\lambda_{CutOff}$ and the cut-off wavelength of previous mirror film constructions (385 nm) divided by the total UV power density between 300 and 385 nm (23.4 W/m²):

$$P_{SR} = \frac{2.62\% \cdot \int_{\lambda_{CutOff}}^{385\,nm} I(\lambda) d\lambda}{\int_{300\,nm}^{385\,nm} I(\lambda) d\lambda} \quad (4)$$

To obtain the percentage point increase in SWHR requires an inclusion of the spectral reflectance, $\rho(\lambda)$, as part of the integrand:

$$P_{SWHR} = \frac{2.62\% \cdot \int_{\lambda_{CutOff}}^{385\,nm} I(\lambda) \rho(\lambda) d\lambda}{\int_{300\,nm}^{385\,nm} I(\lambda) d\lambda} \quad (5)$$

Figure 13:
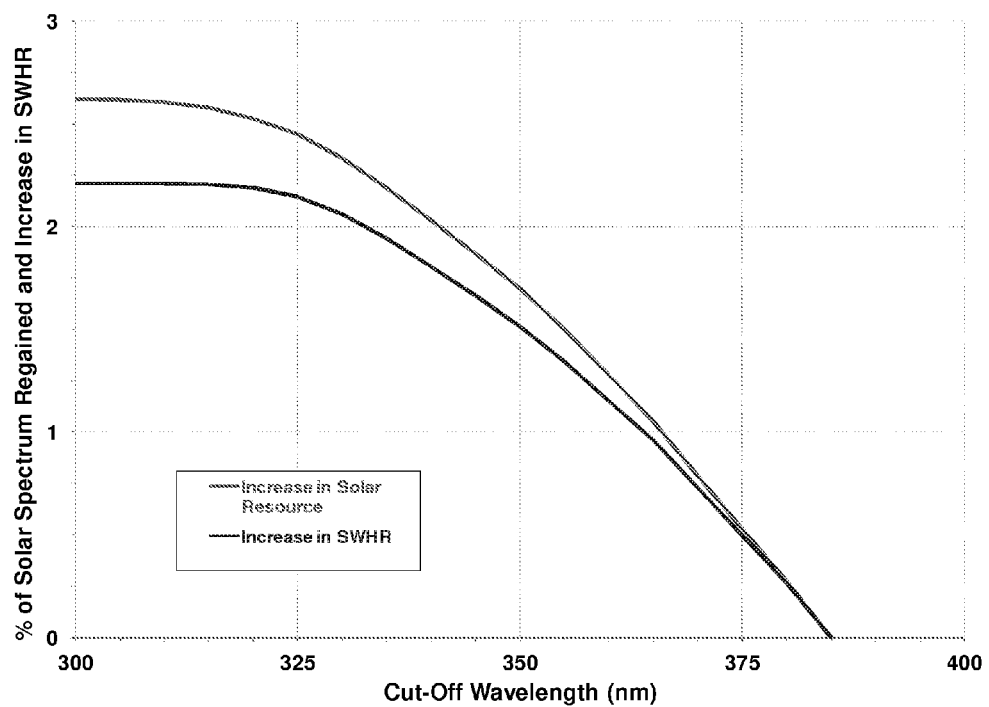
FIG. 13 illustrates the percentage of solar spectrum regainable and the percentage increase in solar-weighted hemispherical reflectance as a function of cut-off wavelength of an ultraviolet absorbing abrasion resistant layer.

Results are plotted in FIG. 13, showing the percentage of the terrestrial solar spectrum regainable as a function of ultraviolet absorber cut-off wavelength, and the corresponding increase in solar-weighted hemispherical reflectance for the spectral reflectance of Cu/Ag/PET. As an example, $\lambda_{CutOff} \approx 375$ nm for the A0111261 and Cyasorb UV1164L UVA packages shown in FIG. 12. If one of these ultraviolet absorber packages is used, an additional 0.5% reflectance is achieved.

Another target for $\lambda_{CutOff}$ is 355 nm. As shown by its light absorption profile, polyethylene terephthalate (PET) absorbs in the range from 290 to 350 nm and, as it does, it degrades photolytically [Wypych]. It is hypothesized that the most critical region to protect via the UV coatings is 300 to 345 nm. Thus, a cut-off wavelength of 355 nm is feasible in terms of protecting both the underlying PET film and the abrasion resistant coating as well. From FIG. 13, pushing the UV cut-off wavelength down to ~355 nm allows recapture of ~1.5% of the available solar resource, which translates into an increase in SWHR of ~1.3% (based on the spectral reflectance of typical Cu/Ag/PET reflective film constructions).

REFERENCES

Kanouni, M., "Degradation and Stabilization of Organic Coatings", Ciba Specialty Chemicals presentation at NREL, Apr. 8, 2004.

Blanksby, S. J., and Ellison, G. B., "Bond Dissociation Energies of Organic Molecules", Acc. Chem. Res., Vol. 36, 2003, pp. 255-263.

Wypych, G., Handbook of Material Weathering, 2nd Edition, Chem Tech Publishing, 1995, pp. 357-363.

U.S. Pat. No. 4,307,150 for Weatherable Solar Reflector, issued on Dec. 21, 1981.

U.S. Pat. No. 4,645,714 for Corrosion-resistant Silver Mirror, issued on Feb. 24, 1987.

U.S. Patent Application Publication US 2012/0011850 for Broadband Reflectors, Concentrated Solar Power Systems, and Methods of Using the Same, published on Jan. 19, 2012.

ASTM Standard D4060, "Standard Test Method for Abrasion Resistance of Organic Coatings by the Taber Abraser".

ASTM G173, "Standard Tables for Reference Solar Spectral Irradiances: Direct Normal and Hemispherical on 37° Tilted Surface".

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

It must be noted that as used herein and in the appended claims, the singular forms "a", "an", and "the" include plural reference unless the context clearly dictates otherwise. Thus, for example, reference to "a layer" includes a plurality of such layers and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A multilayer reflective film comprising:
an adhesive layer;
a metal layer above the adhesive layer;
a polymeric layer above the metal layer; and
an abrasion resistant layer above the polymeric layer;
wherein the abrasion resistant layer has a cut-off wavelength less than 385 nm, and
wherein the abrasion resistant layer comprises a polymer, an acrylate, an acrylic, a polyolefin, a cyclic olefin polymer, a cyclic olefin copolymer, a thermoplastic, nano-particle coatings, sol gel coatings or any combination of these.

2. A multilayer reflective film comprising:
a polymeric layer;
a metal layer above the polymeric layer; and
an abrasion resistant layer above the metal layer;
wherein the abrasion resistant layer has a cut-off wavelength less than 385 nm, and
wherein the abrasion resistant layer comprises a polymer, an acrylate, an acrylic, a polyolefin, a cyclic olefin polymer, a cyclic olefin copolymer, a thermoplastic, nano-particle coatings, sol gel coatings or any combination of these.

3. The reflective film of claim 2, further comprising an adhesive layer beneath the polymeric layer.

4. The reflective film of claim 1, further comprising a backside metal protective layer below the metal layer.

5. The reflective film of claim 4, wherein the backside metal protective layer comprises copper, chromium, nickel or any alloy of these.

6. The reflective film of claim 1 further comprising an adhesion-promoting layer below the abrasion resistant layer.

7. The reflective film of claim 6, wherein the adhesion-promoting layer comprises a region of the polymeric layer or metal layer that has undergone surface treatment.

8. The reflective film of claim 7, wherein the surface treatment comprises a plasma treatment or a corona discharge treatment.

9. The reflective film of claim 1, wherein the abrasion resistant layer absorbs a majority of ultraviolet electromagnetic radiation having a wavelength less than the cut-off wavelength, thereby protecting underlying layers by reducing exposure of the underlying layers to ultraviolet electromagnetic radiation having a wavelength less than the cut-off wavelength.

10. The reflective film of claim 1, wherein the abrasion resistant layer transmits a majority of electromagnetic radiation having a wavelength greater than the cut-off wavelength, thereby exposing one or more underlying layers to electromagnetic radiation having a wavelength greater than the cut-off wavelength.

11. The reflective film of claim 1, wherein the abrasion resistant layer has a cut-off wavelength selected from the range of 345 nm to 385 nm.

12. The reflective film of claim 1, wherein the abrasion resistant layer has a thickness selected from the range of 2 µm to 10 µm.

13. The reflective film of claim 1, wherein the abrasion resistant layer comprises a UV cured acrylate, poly(methylmethacrylate) (PMMA), ethylene-norbornene copolymer, polynorbornene, Zeonex®, Zeonor®, CR-39, copolymerized styrene and methyl methacrylate, NAS®, ZYLAR® or any combination of these.

14. The reflective film of claim 1, wherein the abrasion resistant layer is an abrasion resistant coating (ARC).

15. The reflective film of claim 1, wherein the abrasion resistant layer comprises one or more ultraviolet absorbing compounds and wherein at least one of the one or more ultraviolet absorbing compounds has a cut-off wavelength less than 385 nm.

16. The reflective film of claim 15, wherein at least one ultraviolet absorbing compound is selected from the group consisting of oxanilide, benzophenone, HP triazine, benzotriazole, formamidine and any derivatives of these.

17. The reflective film of claim 1, wherein at least one ultraviolet absorbing compound has a concentration in the abrasion resistant layer selected from the range of 0.5% to 5% by weight.

18. The reflective film of claim 15, wherein concentrations of the one or more ultraviolet absorbing compounds are selected so as to provide a cut-off wavelength to the abrasion resistant layer less than 385 nm.

19. The reflective film of claim 1, wherein the metal layer is exposed to incident solar radiation having wavelengths selected from the range between the cut-off wavelength of the abrasion resistant layer and 385 nm and incident solar radiation having wavelengths selected from the range of 385 nm to 2.5 µm.

20. The reflective film of claim 1, wherein the metal layer comprises a silver layer.

21. The reflective film of claim 1, wherein the metal layer comprises a multilayer including a copper backside protective layer and a silver layer.

22. The reflective film of claim 1, wherein the metal layer has a thickness selected from the range of 0.05 µtm to 0.15 µm.

23. The reflective film of claim 1, wherein the polymeric layer comprises a polyester.

24. The reflective film of claim 23, wherein the polymeric layer comprises polyethylene terephthalate (PET).

25. The reflective film of claim 1, wherein the polymeric layer has a thickness selected from the range of 10 µm to 130 µm.

26. The reflective film of claim 1, wherein the adhesive layer comprises a pressure sensitive adhesive.

27. The reflective film of claim 1, wherein the adhesive layer has a thickness selected from the range of 10 µm to 60 µm.

28. The reflective film of claim 1, wherein the reflective film further comprises a release liner, wherein the release liner is beneath the adhesive layer or wherein the release liner is in physical contact with the adhesive layer.

29. The reflective film of claim 1, wherein the reflective film is more than 85% reflective to electromagnetic radiation in the terrestrial solar spectrum.

30. The reflective film of claim 1, wherein the multilayer reflective film does not include an acrylic layer.

31. The reflective film of claim 1, wherein the multilayer reflective film does not include an acrylic layer between the polymeric layer and the abrasion resistant layer.

32. The reflective film of claim 1, wherein the adhesive layer and the metal layer are in physical contact.

33. The reflective film of claim 1, wherein the metal layer and the polymeric layer are in physical contact.

34. The reflective film of claim 1, wherein the abrasion resistant layer and the polymeric layer are in physical contact.

35. The reflective film of claim 2, wherein the abrasion resistant layer and the metal layer are in physical contact.

36. The reflective film of claim 1, wherein the reflective film consists essentially of the metal layer, the polymeric layer and the abrasion resistant layer.

37. The reflective film of claim 1, further comprising a single or multilayer dielectric stack above the metal layer.

38. The reflective film of claim 1, wherein the total thickness of the multilayer reflective film is selected from the range of 10 µm to 130 µm.

39. The reflective film of claim 1 for use in a solar collecting application.

40. The reflective film of claim 1 for use in concentrating solar energy.

41. The reflective film of claim 1, wherein a solar-weighted hemispherical reflectance of the multilayer reflective film includes a contribution from reflection of electromagnetic radiation having wavelengths between the cut-off wavelength of the abrasion resistant layer and 385 nm.

42. A method of collecting solar radiation, the method comprising the steps of:
   positioning a multilayer reflective film to receive incident solar radiation;
   providing a target in optical communication with the reflective film; and
   reflecting at least a portion of the incident solar radiation to the target;
   wherein the multilayer reflective film is the multilayer reflective film of claim 1.

43. The method of claim 42 for use in concentrating solar energy.

44. The multilayer reflective film of claim 1, wherein the abrasion resistant layer comprises a polymer.

45. The multilayer reflective film of claim 2, wherein the abrasion resistant layer comprises a polymer.

* * * * *